(12) United States Patent  
Kessel et al.

(10) Patent No.: US 11,966,879 B2  
(45) Date of Patent: Apr. 23, 2024

(54) SYNCHRONIZATION OF DIGITAL CONTENT

(71) Applicant: Amazon Technologies, Inc., Seattle, WA (US)

(72) Inventors: Steven Kessel, Seattle, WA (US); Ian W. Freed, Seattle, WA (US); Guy A. Story, New York, NY (US); Howard Wolfish, Berkeley Heights, NJ (US); Amit D. Agarwal, Mercer Island, WA (US); Nanyan Li, Seattle, WA (US); John Lattyak, Los Gatos, CA (US); James C. Slezak, Seattle, WA (US); Beryl Tomay, Newcastle, WA (US); Jeffrey P. Bezos, Greater Seattle Area, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/656,626

(22) Filed: Mar. 25, 2022

(65) Prior Publication Data

US 2023/0040830 A1    Feb. 9, 2023

Related U.S. Application Data

(63) Continuation of application No. 16/690,939, filed on Nov. 21, 2019, now Pat. No. 11,288,632, which is a  
(Continued)

(51) Int. Cl.
*G06F 13/00*    (2006.01)  
*G06Q 10/10*    (2023.01)  
*H04L 67/1095*  (2022.01)

(52) U.S. Cl.  
CPC ......... *G06Q 10/10* (2013.01); *H04L 67/1095* (2013.01)

(58) Field of Classification Search  
CPC ........................... G06Q 10/10; H04L 67/1095  
(Continued)

(56) References Cited

U.S. PATENT DOCUMENTS 5,146,552 A    9/1992  Cassorla et al.  
6,260,011 B1   7/2001  Heckerman et al.  
(Continued)

*Primary Examiner* — Kenneth R Coulter  
(74) *Attorney, Agent, or Firm* — Knobbe Martens Olson & Bear LLP

(57) ABSTRACT

Aspects of the present disclosure relate to the sharing of synchronization information corresponding to content among devices in a communication network. An originating device collects synchronization information related to the presentation of content to a user via the originating device. The synchronization information is defined according to reference points related to the presentation of the content to the user via the originating device, including a current state of the presentation of the content and/or additional information obtained during the presentation of the content. Based on detection of a synchronization event, the originating device transmits the collected synchronization information, resulting in the receipt of the synchronization information by one or more receiving devices. Thereafter, the presentation of the content to the user on one of the receiving devices can incorporate the synchronization information collected and transmitted by the originating device.

21 Claims, 18 Drawing Sheets

Related U.S. Application Data continuation of application No. 15/640,252, filed on Jun. 30, 2017, now abandoned, which is a continuation of application No. 13/620,702, filed on Sep. 14, 2012, now Pat. No. 9,697,497, which is a continuation of application No. 12/273,473, filed on Nov. 18, 2008, now Pat. No. 8,832,319.

(58) Field of Classification Search
USPC .............. 709/248, 227, 228, 226, 223, 220; 713/400, 401, 500–503, 600
See application file for complete search history.

(56) References Cited

U.S. PATENT DOCUMENTS

| | | | |
|---|---|---|---|
| 6,295,541 B1 | 9/2001 | Bodnar et al. | |
| 6,933,928 B1 | 8/2005 | Lilienthal | |
| 7,099,946 B2 * | 8/2006 | Lennon | G06V 20/30 709/227 |
| 7,788,382 B1 | 8/2010 | Jones et al. | |
| 7,877,450 B2 * | 1/2011 | Odell | H04L 67/148 709/227 |
| 8,181,226 B2 * | 5/2012 | Lohr | H04L 67/14 709/227 |
| 8,392,580 B2 * | 3/2013 | Allen | H04L 67/148 709/227 |
| 8,428,682 B1 | 4/2013 | Rood et al. | |
| 8,799,484 B2 * | 8/2014 | Allen | H04L 65/1094 709/227 |
| 8,832,319 B2 * | 9/2014 | Kessel | H04L 67/1095 709/248 |
| 9,697,497 B2 * | 7/2017 | Kessel | H04L 67/1095 |
| 11,288,632 B2 * | 3/2022 | Kessel | G06Q 10/10 |
| 2002/0054073 A1 | 5/2002 | Yuen | |
| 2002/0156798 A1 | 10/2002 | Larue et al. | |
| 2003/0101329 A1 | 5/2003 | Lahti et al. | |
| 2003/0131045 A1 | 7/2003 | McGee et al. | |
| 2003/0229900 A1 * | 12/2003 | Reisman | H04N 21/4755 348/E7.071 |
| 2005/0022113 A1 | 1/2005 | Hanlon | |
| 2005/0027755 A1 | 2/2005 | Shah et al. | |
| 2005/0138551 A1 | 6/2005 | Elazar et al. | |
| 2005/0177617 A1 | 8/2005 | Banginwar et al. | |
| 2005/0228891 A1 | 10/2005 | Itoh et al. | |
| 2006/0002681 A1 | 1/2006 | Spilo et al. | |
| 2006/0085429 A1 | 4/2006 | Wener et al. | |
| 2006/0172724 A1 | 8/2006 | Linkert et al. | |
| 2007/0055926 A1 | 3/2007 | Christieansen et al. | |
| 2007/0136479 A1 * | 6/2007 | Miller | H04L 67/01 709/227 |
| 2007/0255854 A1 | 11/2007 | Khosravy et al. | |
| 2008/0114830 A1 | 5/2008 | Welingkar et al. | |
| 2008/0133529 A1 | 6/2008 | Berkowitz et al. | |
| 2008/0133775 A1 | 6/2008 | Peterson et al. | |
| 2008/0289029 A1 * | 11/2008 | Kim | G06F 16/9577 709/228 |
| 2009/0077263 A1 | 3/2009 | Koganti et al. | |
| 2009/0210536 A1 * | 8/2009 | Allen | H04L 67/14 709/227 |
| 2010/0042235 A1 | 2/2010 | Basso et al. | |
| 2010/0042702 A1 | 2/2010 | Hanses | |
| 2013/0117457 A1 * | 5/2013 | Allen | H04L 65/1094 709/227 |

* cited by examiner

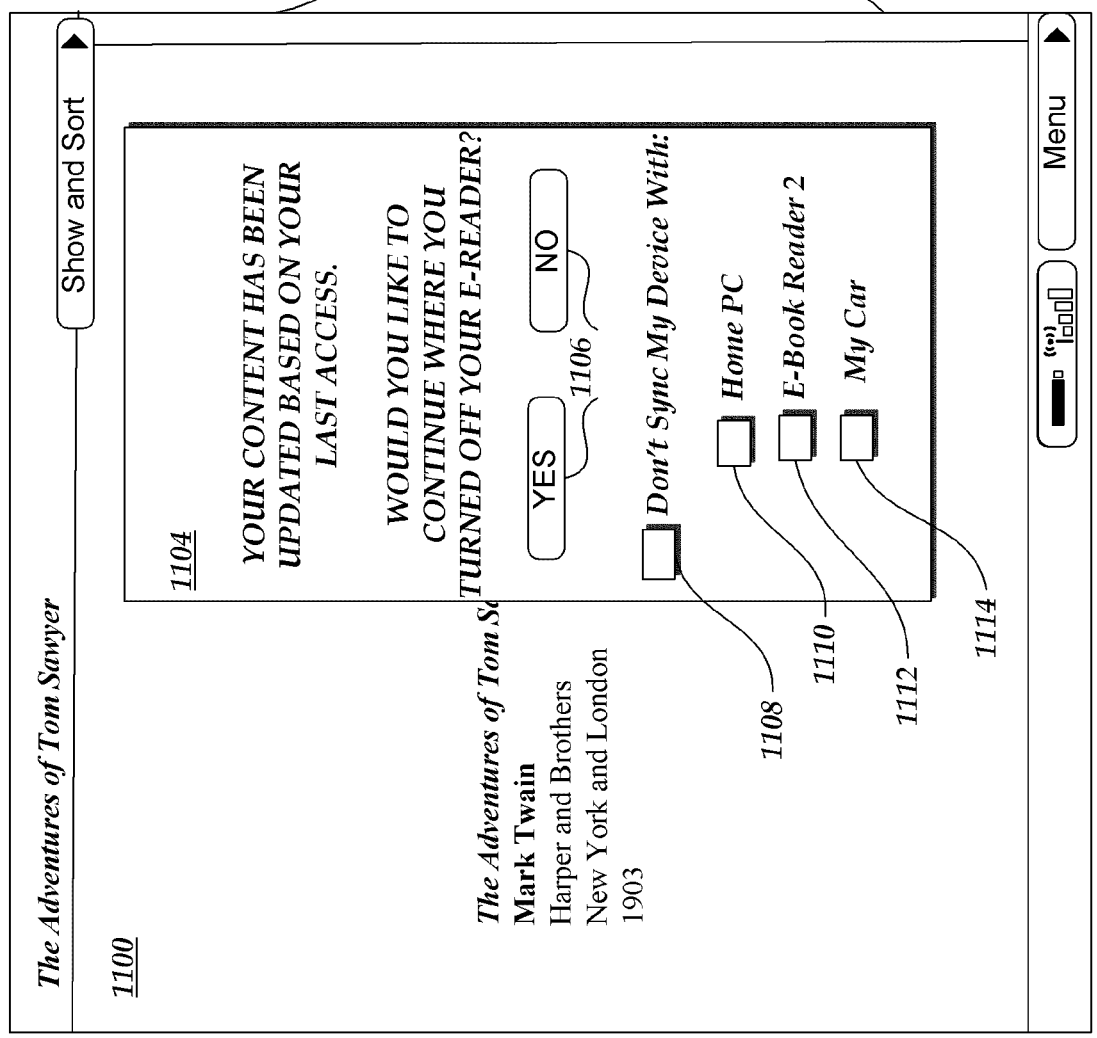

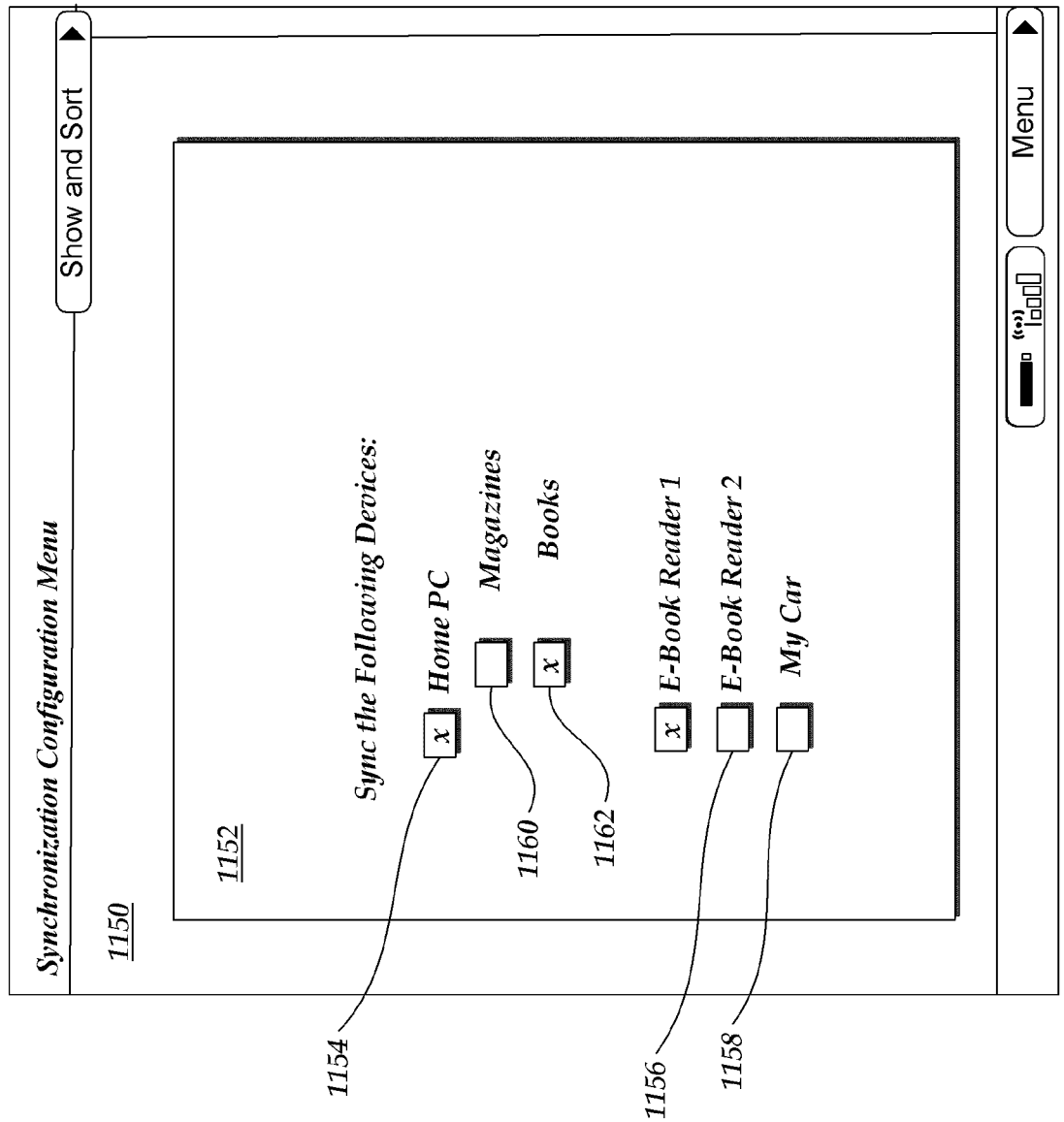

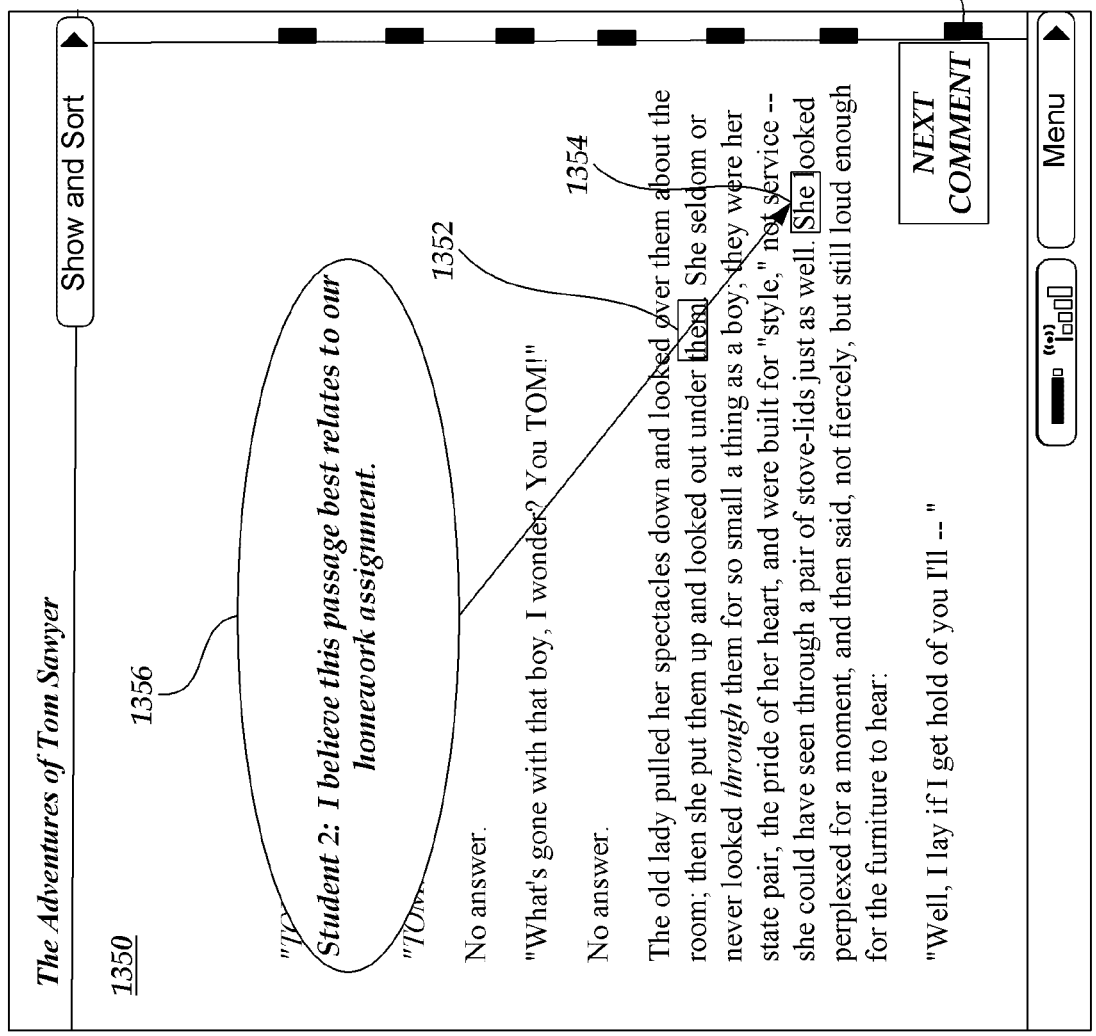

SYNCHRONIZATION OF DIGITAL CONTENT

CROSS-REFERENCED TO RELATED APPLICATIONS

This application is a continuation of U.S. patent application Ser. No. 15/640,252, now U.S. Pat. No. 11,288,632, entitled SYNCHRONIZATION OF DIGITAL CONTENT, and filed Jun. 30, 2017, which is a continuation of U.S. patent application Ser. No. 13/620,702, entitled SYNCHRONIZATION OF DIGITAL CONTENT, and filed Sep. 14, 2012, now U.S. Pat. No. 9,697,497, which is a continuation of U.S. patent application Ser. No. 12/273,473, entitled SYNCHRONIZATION OF DIGITAL CONTENT, and filed Nov. 18, 2008, now U.S. Pat. No. 8,832,319, the disclosures of which are hereby incorporated by reference in their entireties.

BACKGROUND

Generally described, computing devices and communication networks facilitate the collection and exchange of information. In a common application, computing devices, such as personal computing devices, can utilize a wide area communication network, generally referred to as the Internet, to access content, or other data, from other computing devices associated with content providing entities. The specific design/function of each computing device can vary the type of content exchanged between the computing devices.

Users can request data from a content providing entity so that the content is delivered to one or more computing devices in a relatively "real time" basis. For example, users can request content from a network resource (e.g., a Web site) for immediate rendering on a computing device display screen or they can request the immediate transfer of content, such as a document or data file, from a network resource or Web service for storage on the computing device. In another example, users can transmit a request, or initiate a transaction, that results in the downloading or streaming of content to a computing device. Typically, the content providing entity would initiate the transfer upon receipt of the request from the computing device.

In one application, various computing devices associated with a user or a user account have access to different representations of the content provided by content providing entities. For example, a user may be associated with a wireless computing device corresponding to an electronic book reader ("e-book reader") that has obtained a digital representation of content (e.g., a digital publication that can be presented on an e-book reader) via a communication network (e.g., a wireless communication network). The same user may also be associated with a personal computing device that has obtained a separate representation of the same content (e.g., a copy of the digital publication that can be presented on a display associated with the e-book reader) via the same or a different communication network. Still further, the user may be associated with a digital audio player that has also obtained a separate representation of the same content (e.g., an audio book that can be audibly presented via headphones/speakers) from the same or a different communication network.

Depending on the capabilities and functionality associated with each respective device and the specific nature of the content, a user accesses content via a presentation interface provided, or otherwise associated, with a specific device (e.g., a display on a wireless e-book reader device). In some devices, the user can provide, or associate, additional information with the content, such as annotations, bookmarks, excerpts, etc., during the presentation of the content on a specific device. However, the state/progress of the presentation of the specific representation of the content at one of the specific devices, as well as any additional information provided by the user during the presentation, is not readily provided to other devices associated with the user, or user account.

BRIEF DESCRIPTION OF THE DRAWINGS

The foregoing aspects and many of the attendant advantages will become more readily appreciated by reference to the following detailed description, when taken in conjunction with the accompanying drawings, wherein:

FIGS. 11A and 11B are illustrative interfaces generated on a wireless device for configuring the incorporation of synchronization information associated with content accessible by the wireless device;

FIGS. 13A and 13B are illustrative interfaces generated on a wireless device based on the incorporation of synchronization information associated with content accessible by the wireless device.

DETAILED DESCRIPTION

Figure 1:
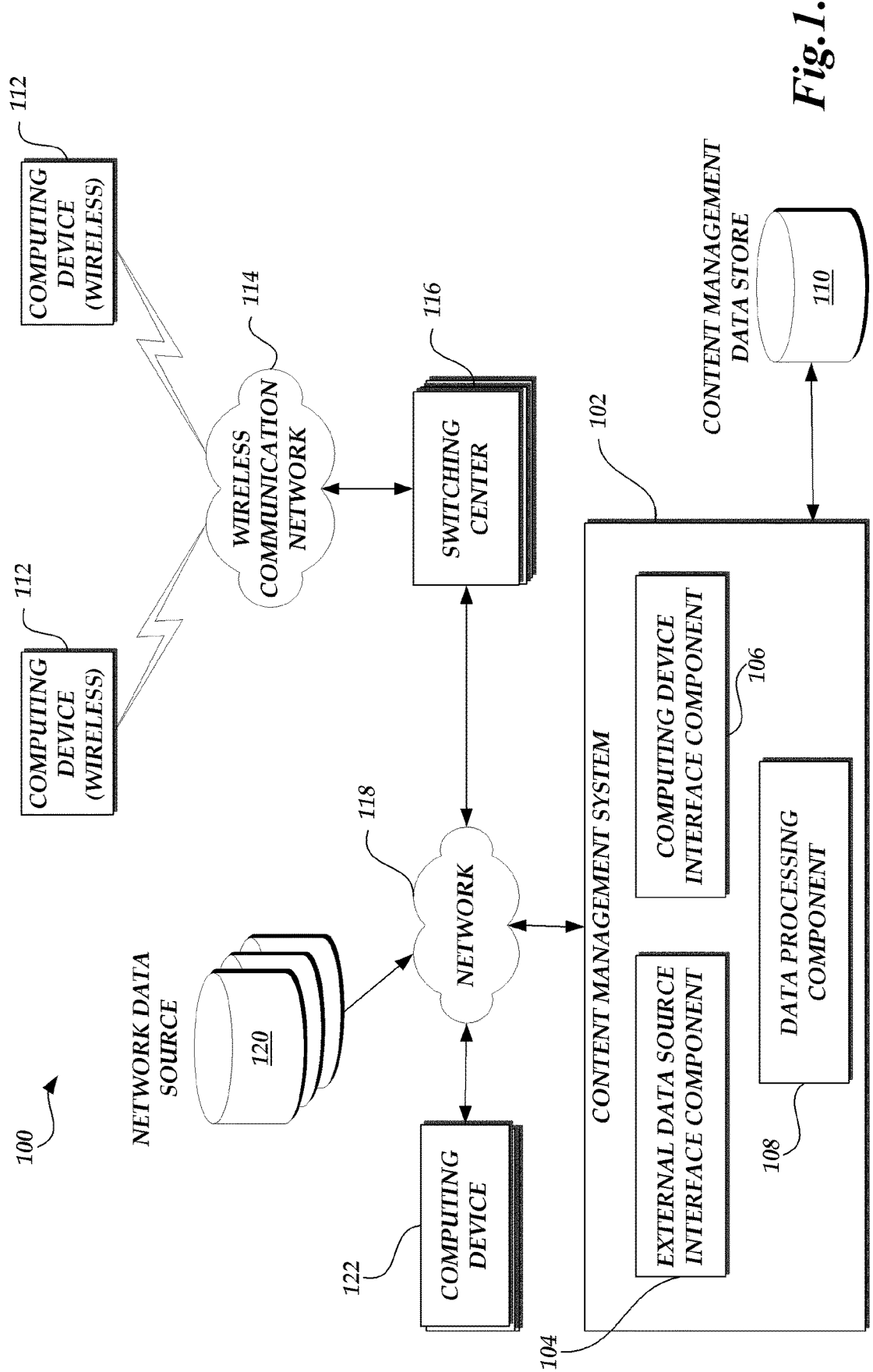
FIG. 1 is a block diagram illustrative of a content management environment for use in facilitating the sharing of synchronization information between devices based on determination of synchronization events.

Generally described, aspects of the present disclosure relate to the management of content and/or information related to the content. Specifically, aspects of the present disclosure relate to sharing synchronization information associated with content among devices in a communication network. A first device (e.g., the "originating device") collects synchronization information related to the presentation of content to a user via the originating device. Content can refer to any data that can be directly or indirectly accessed by a user, including, but not limited to, multi-media data, digital images, digital video, displayable text, audio data, electronic documents, electronic publications, computer-executable code, portions of the above, and the like. Additionally, the synchronization information is defined according to reference points, or tracking points, related to the presentation of the content originating device and can include a current state of the presentation of the content on the originating device or additional information obtained during the presentation of the content (e.g., annotations, bookmarks, excerpts, etc.). The presentation of the content will vary as a function of the capabilities and configuration of the device (e.g., a portable e-book reader vs. a mobile phone) and the format of the content (e.g., a digital publication vs. a video). Illustratively, based on a determination of a synchronization event, the originating device transmits the collected synchronization information, resulting in the receipt of the synchronization information by one or more receiving devices. Thereafter, the presentation of the content to the user on one of the receiving devices can incorporate the synchronization information collected and transmitted by the originating device.

For purposes of illustrative examples, a user may have three devices (e.g., a wireless e-book reader, an audio player and a desktop computer) among which synchronization information is to be shared for each digital representation of the same content. The user has specified that the presentation of content, such as a digital representation of *The Adventures of Tom Sawyer,* contained on each device is to remain synchronized. The user accesses the digital representation of *The Adventures of Tom Sawyer* on the wireless e-book reader, making the wireless e-book reader an originating device. During the presentation of the digital publication, a synchronization component on the wireless e-book reader collects synchronization information related to the presentation of that content. The synchronization information can include information related to the relative progress of the presentation, or a state of presentation, of the digital representation of the content (e.g., the digital representation of *The Adventures of Tom Sawyer*). Relative progress can be defined according to reference points, or tracking points, associated with the digital representation of the content (e.g., a specific chapter, sub-chapter, paragraph, word grouping/block, word, etc.).

In addition to collecting synchronization information, the wireless e-book reader can also determine when a synchronization event occurs, such as the user setting down the wireless e-book reader, and transmit the collected synchronization information to the other devices. The transmitted synchronization information may then be used by the other devices to synchronize the presentation of *The Adventures of Tom Sawyer* on those devices with that of the wireless e-book reader. Accordingly, should the user elect to continue reading *The Adventures of Tom Sawyer* on the desktop computer, the desktop computer would also begin presentation of the content at the location where the user stopped presentation of the digital representation of the content on the e-book reader. The series of collecting synchronization information, detecting a synchronization event, transmitting synchronization information and synchronizing the presentation of content among devices may continue as the user progresses through the content. Through this process, regardless of which device the user selects or the type of digital representation selected, the presentation of the content will resume from where the user last stopped.

In accordance with another illustrative embodiment, a user utilizes a device, such as a personal computer, for the presentation of digital content (e.g., a digital representation of *The Adventures of Tom Sawyer*), making the personal computer the originating device. In the manner described above, during the presentation of the content to the user, a synchronization component on the personal computer collects synchronization information related to the presentation of the digital representation of *The Adventures of Tom Sawyer* to the user, which includes progress information corresponding to a current state of the presentation of the content, as well as annotation and bookmark information provided by the user during the presentation.

During the presentation of the digital representation of *The Adventures of Tom Sawyer,* the synchronization component also determines that one or more synchronization events have occurred. In this example, assume the originating device is a personal computer with a constant communication network connection and constant power supply. Accordingly, in this example, the synchronization component has been configured to determine time-based synchronization event (e.g., a synchronization event every two minutes). Accordingly, at the specified time intervals, the synchronization component transmits the synchronization information associated with the content to the content management system.

In this illustrative example, the content management system processes the received synchronization information associated with the content at the originating device (e.g., the personal computer) and determines one or more receiving devices that should receive at least a subset of the synchronization information. The determination of which device should receive synchronization information and/or the determination of the subset of the synchronization information that each selected receiving device will receive is based on the configuration, capabilities or available functionality associated with each potential receiving device. For purposes of this illustrative example, assume that at least one of the selected receiving devices includes a consumer device for use in a vehicle (e.g., a car radio or portable media player). The consumer device has access to a digital representation of *The Adventures of Tom Sawyer* in the form of an audio version of the content. Due to its capabilities, the consumer device can only incorporate synchronization information related to the progress of the previous presentation of the content via the originating device (e.g., the computing device). Thus, the consumer device cannot incorporate synchronization information, such as annotation or bookmark information, based on the limitations of the consumer device or based on a configuration associated with the consumer device. However, when the user accesses the representation of the content (e.g., the audio version) via the consumer device, the consumer device begins the presentation of the content at the same reference point, or substantially the same reference point, in which the presentation of the content was stopped on the originating computing device. In this case, the progress information has been incorporated for purposes of synchronizing the audio representation of the content. Accordingly, if necessary, the receiving device can process the progress information, such as transforming the format of the progress information, in a manner suitable to be applicable with the presentation of the audio representation.

With continued reference to the illustrative example, by utilizing a communication network, such as a wireless communication network or direct communication link, the synchronization process can be repeated as the originating device transmits the user's progress during the presentation of the content (e.g., the audio version) to the other devices associated with the user or user account. Assume that the user is also associated with a mobile phone receiving device that has been selected to receive the synchronization information generated by the consumer device (e.g., the new originating device). The mobile phone has access to a representation of the content in the form of an abridged version of the digital representation of *The Adventures of Tom Sawyer* for presentation on a display screen associated with the mobile phone. In this example, the mobile phone has previously received a subset of the synchronization information generated by a personal computer in the form of the progress information, annotations, and bookmarks for the portions of content included in the abridged version. Upon receipt of the synchronization information from the consumer device, the mobile phone utilizes the synchronization information, including the most recent progress information, to continue the presentation of the content to the user. Additionally, the mobile phone also makes the annotation and bookmark information (generated by the computer device) available to the user.

In a further illustrative example, the content management system and/or originating device can incorporate aspects of a peer-to-peer device distribution model for distributing the synchronization information to receiving devices. In one application, the originating device collects the synchronization information and transmits the synchronization information to the content management system upon detection of a synchronization event, such as in any of the manners described above. For example, assume that each student in a classroom can access a representation of content (e.g., a digital representation of *Romeo and Juliet*) via a personal computer as part of a collaborative effort to review a historically significant piece of literature. Based on configuration information associated with each personal computer, each student's progress related to the presentation of *Romeo and Juliet* and any additional information in the form of annotations, excerpts, and/or bookmarks is collected as synchronization information and is prepared for transmission. The transmission may, for example, occur upon expiration of an allotted time period to access the content (e.g., a synchronization event corresponding to the expiration of the time period).

In a first application, the content management system identifies the receiving devices that should receive at least a subset of the synchronization information, namely, receiving devices associated with the other students in the classroom as well as a receiving device associated with a teacher. Additionally, because each personal computer is configured to operate as an originating device, the content management system can process the incoming synchronization information to generate a consolidated set of synchronization information, which can include the filtering of inconsistent synchronization information, conflict resolution, and/or integration of synchronization associated with multiple users/devices. To distribute the synchronization information, however, the content management system transmits a notification to one or more peer devices (possibly including the originating device) requesting that these devices serve as sources of the synchronization information and provide the selected receiving devices with the synchronization information if needed. The content management system then transmits notifications to the selected receiving devices to request the synchronization information from an identified peer device. With regard to the illustrative example, in the first application, one or more of the devices associated with the students would be utilized to transmit the consolidated synchronization information. Devices associated with the same students can then be configured to request and receive a subset of the collected synchronization information, such as bookmarks, annotations, and excerpts, while excluding the incorporation of progress information for each individual originating device. Additionally, devices associated with a teacher or facilitator can be configured to request and receive a different subset of the collected synchronization information, including progress information associated with all the devices in addition to the annotation, bookmark and excerpt information.

In a second application, the originating device again collects the synchronization information. However, upon detection of a synchronization event, the originating device does not transmit the synchronization information to a separate content management system. Instead, a content management component associated with the originating device transmits the synchronization information to one or more peer devices known to the originating device to be eligible to receive the synchronization information (e.g., peer devices associated with the same user or user account). Additionally, each receiving peer device can in turn transmit to other peer devices known to the receiving peer device to be eligible to receive the synchronization information. Upon receipt of the incoming synchronization information, each content management component can incorporate additional synchronization information collected on that specific device, filter inconsistent information and/or perform other conflict resolution. Thus, in the second application, the synchronization information can be propagated to the peer devices without need for a central source (e.g., the content management system).

In yet another illustrative example, an originating device can be configured to vary the synchronization information that is collected by the synchronization component, the events that are to be considered synchronization events, and/or the receiving devices that receive the synchronization information (directly or indirectly) from the originating devices. With regard to the information that is collected as synchronization information, a device, such as a wireless e-book reader, can generate interfaces for allowing a user to identify specific data or types of data that should be collected as synchronization information. With reference to the previous example related to the collaborative student effort, each computing device may be configured such that only annotations, bookmarks or excerpts generated by the students are collected as synchronization information because each student's relative progress in the presentation of the content will not be shared.

In another example related to the configuration of synchronization information, a user may wish to have only portions of the additional information generated by the user included in the synchronization information. For example, the user may configure the synchronization information to include only the content excerpts generated by clipboard functionality. In a further example related to the configuration of synchronization information, a user listening to an audible format of a digital publication may be presented with selectable controls that allow the user to specify specific reference points in the presentation of the audible content (e.g., points of progress) that will be synchronized to the user's other device (e.g., skipping forward or moving backward). In still another example related to the configuration of synchronization information, a user may be presented with various screen interfaces, such as a network resource, in which the user is able to manually indicate progress or adjust progress that is synchronized to the user's devices. With regard to this example, a screen interface may allow the user to manually track progress associated with the user reading a hard copy of a publication so that digital copies of the same publication are synchronized in accordance with the user's progress in the hard copy of the publication. Still further, the synchronization information can include information related to settings for the presentation of the content, including playback speed, fonts, colors, and/or other customizable settings related to the device, the content or the user.

As mentioned above, a synchronization event can be determined based on one or more inputs associated with the device (e.g., power levels, wireless communication network strength, motion sensors, timers, activation of headphones/speakers, etc.). In another aspect, the synchronization event can correspond to an expressed instruction/command issued by the user to synchronize information related to the content being presented (e.g., "record my last page read"). As will be appreciated, a synchronization event can correspond to any type of input or occurrence detectable by the device and the ones provided herein are only illustrative examples and not to be considered limiting. To configure the determination of synchronization events, a device, such as a mobile phone, can generate interfaces for allowing a user to identify specific types of device data that should be monitored for determining synchronization events or establishing thresholds for establishing synchronization events, or both. For example, a user or system administrator can specify a synchronization event for a portable device according to minimum power level (e.g., transfer the synchronization information before the device powers off, loses communication capabilities, among other possibilities). In another example, a user can specify a synchronization event for a portable device based on a communication signal strength criteria (minimum sustained communication signal strength). In a further example, a user can specify a synchronization event for a device based on a determination by a communication management component of an anticipated unavailability of the device to establish communication some time in the near future. In still another example, a user can specify a synchronization event for a device based on sensors associated with the operation of the device during the presentation of content, such as motion detectors indicative of the device being set down, timers indicative of longer periods of inactivity, sensors detecting that headphones/speakers are available, and the like. Still further, some devices, such as portable devices, can further be configured to limit the number of synchronization events that occur to preserve battery life.

With regard to the information that specifies which receiving devices receive synchronization information (directly or indirectly), the originating devices can generate various interfaces that are presented to the users. The interfaces can include controls for selecting specific devices or types of devices that should receive synchronization information. For example, a user account may include two wireless e-book readers, one e-book reader for a user and the other e-book reader for the user's child. In this example, the user can configure, via an interface generated by an originating device, that the other e-book reader associated with user's account should not receive the synchronization information even though the second e-book reader has a representation of the content. In another example, a user sharing an account with three other individuals may generally specify that the synchronization information shared between the devices should be limited to only annotations and not each individual user's progress through the presentation of content. However, the same user can specify that for specific pieces of content (e.g., a specific work of literature) or types of content (e.g., content related to holiday materials), the synchronization information will include additional information including progress information.

In still another example, a user account may be associated with an e-book reader that has advanced functionality for annotating and presenting content. Additionally, the user account may be associated with a personal computing device that has a software application for presenting the same digital publication without any of the advanced functionality. In this example, the user (or a system administrator) can limit the transmission of any synchronization information related to the advanced functionality of the e-book reader so that it is not transmitted to the personal computing device.

In accordance with one aspect, in response to a determined synchronization event, the originating device transmits synchronization information to a content management system (described below) via a wireless communication network. Through implementation of a "pull" model, the content management system processes the received synchronization information associated with the representation of the content (e.g., the digital publication) and identifies any other device associated with the user or user account that should receive the synchronization information. For example, the content management system may specify that any other device associated with the user or user account should have access to a representation of the content (possibly in a different format) corresponding to the digital publication. The content management system then transmits a synchronization notification message to one or more of the devices (the "receiving devices") indicating that synchronization information is available for the content. Each receiving computing device then processes the notification and in accordance with its own configuration settings and network availability, transmits requests for the synchronization information from the content management system (or other appropriate source).

In accordance with a "push" model, the content management system processes the received synchronization information associated with the representation of the content (e.g., the digital publication) and again identifies any other device associated with the user or user account that should receive the synchronization information related to the representation of the content. In this model, however, the content management system transmits the actual synchronization information to one or more receiving devices via a communication network.

Regardless of whether a "pull" or "push" model, or any other distribution model, is implemented, upon receipt of the synchronization information, each receiving device processes the synchronization information to incorporate the synchronization information with the representation(s) of the content associated with the receiving device. For example, based on incorporation of progress information included in the synchronization information, a hand-held computer receiving device can automatically begin a presentation of a representation of the content (e.g., another copy of the digital publication) at the same reference point in which the presentation was stopped on the wireless e-book reader.

As used herein, the information collected and/or generated by the originating device will be collectively referred to as "synchronization information." However, reference to "synchronization information" does not imply any limitation as to any singular type or specific instance of synchronization information or any combination of synchronization information. Additionally, reference to "originating device," "receiving device," or "device" will not necessarily be limited to any particular type of device or to the illustrative examples of devices described herein. Further, reference to the access of content via a device as the "presentation of the content" will not necessarily be limited to any particular type or form of presentation of content (e.g., visual, aural, etc.) or as to a particular format for the content. Still further, although the term wireless device is used in this document, the term represents any type of device having a component for communicating with one or more other devices via one or more communication paths. The communication paths can include wireless communication paths (via infrared, RF, optical, terrestrial, satellite communication media, etc.), wired communication paths, or a combination thereof. Although aspects of the present disclosure will be described with regard to an illustrative communication device environment and component interactions, communication protocols, flow diagrams and interfaces, one skilled in the relevant art will appreciate that the disclosed embodiments are illustrative in nature and should not be construed as limiting.

With reference now to FIG. 1, a block diagram illustrative of a content management environment 100 for managing synchronization information related to content among a plurality of devices will be described. As illustrated in FIG. 1, content management environment 100 includes a content management system 102 for obtaining synchronization information transmitted from a device serving as an originating device upon determination of a synchronization event. Additionally, the content management system 102 can determine one or more devices to serve as receiving devices and cause the transmission of at least a subset of the synchronization information to the receiving devices.

As illustrated in FIG. 1, the content management system 102 can include an external data source interface component 104 for obtaining external information from network-based resources, such as information corresponding to a user associated with the originating device or selected receiving devices. The external data source interface component 104 may also be utilized to cause the transmission of information to one or more receiving devices. The content management system 102 can also include a device interface component 106 for obtaining synchronization information from various originating devices and/or transmitting synchronization information to the receiving devices directly. The content management system 102 can further include a data processing component 108 for processing the synchronization information obtained from the originating device or devices. The data processing component 108 can also determine one or more devices that will be receiving devices for specific synchronization information and, as appropriate, to determine specific subsets of the synchronization information each receiving device will receive. The content management system 102 can further be associated with a content management data store 110 for storing information obtained by the interface components 104, 106 and/or utilized by the data processing component 108, as will be explained in greater detail below.

One skilled in the relevant art will appreciate that the content management system 102 may be operable on one or more computing devices, such as server computing devices. Additionally, the external data source interface component 104, device interface component 106, and data processing component 108 may be implemented in a single computing device or across multiple computing devices. Likewise, although the content management data store 110 is illustrated as local to the content management system 102, the data store 110 can correspond to a distributed data store and/or network based data store. One skilled in the relevant art will also appreciate that the content management system 102 may include any one of a number of additional hardware and software components that would be utilized in the illustrative computerized network environment to carry out the illustrative functions of the content management system 102 and/or any of the individually identified components.

With continued reference to FIG. 1, the content management environment 100 can include any number of computing devices 122 for presenting content to a user. The computing devices 122 can also collect and transmit synchronization information associated with the presentation of content. In an illustrative embodiment, the computing devices 122 can include various hardware or software components, or both, for obtaining and presenting digital content to a user, including, but not limited to, browser software applications, image viewing software applications, electronic publication viewing software applications, media playing software applications, and the like. The computing devices 122 can correspond to a wide variety of devices or components that are capable of initiating, receiving or facilitating communications over a communication network including, but not limited to, personal computing devices, electronic book readers, hand held computing devices, integrated components for inclusion in computing devices, consumer electronics, appliances, electronic devices for inclusion in vehicles or machinery, mobile telephones, modems, personal digital assistants, laptop computers, gaming devices, and the like. In an illustrative embodiment, the computing devices 122 include a wide variety of software and hardware components for establishing communications over one or more communication networks, including wireless communication network 114 or a wired communication network 118. Illustrative components of a computing device 122 will be described in detail with regard to FIG. 2.

As illustrated in FIG. 1, a specific subset of computing devices 122 correspond to wireless computing devices 112 that are capable of initiating, receiving or facilitating communications via a wireless communication network 114. The wireless computing devices 112 can correspond to any of the above identified devices associated with the computing devices 122. Accordingly, although computing devices 122 are illustrated as a separate component from the wireless devices 112, one skilled in the relevant art will appreciate that computing devices 122 will generally encompass all wired devices and wireless devices. Accordingly, wireless devices 112 are only illustrated in FIG. 1 as having the additional functionality of communication via a non-wireless communication network.

In an illustrative embodiment, the content management environment 100 can include a number of additional components, systems and/or subsystems for facilitating communications with the wireless devices 112 and/or the content management system 102. The additional components can include one or more mobile switching centers 116 for establishing communications with the wireless devices 112 via the wireless communication network 114, such as a cellular radio access network, a wireless network based on the family of IEEE 802.11 technical standards ("WiFi"), a wireless network based on IEEE 802.16 standards ("WiMax"), and other wireless networks. The operation of mobile communication networks, such as wireless communication network 114 are well known and will not be described in detail. As illustrated in FIG. 1, the mobile switching center 116 includes interfaces for establishing various communications via a communication network 118, such as the Internet, intranets, private networks and point-to-point networks, generally referred to as the "network." Although the wireless communication network 114 is illustrated as a single communication network, one skilled in the relevant art will appreciate that the communication network can be made up of any number of public or private communication networks and/or network connections.

The content management environment 100 can further include one or more network data stores 120 for providing external information to the computing devices 122, content management system 102 and a combination thereof. The external information can correspond to content, synchronization information, and/or externally referenced information. For example, a network data store 120 may be utilized to maintain and distribute content for presentation to the computing devices 122. In another example, a network data store 120 may be utilized to maintain and distribute synchronization information. In still a further example, a network data store 120 may be used to provide user information regarding devices associated with a user or user account, specific device configuration information, and/or user profile information.

Figure 2:
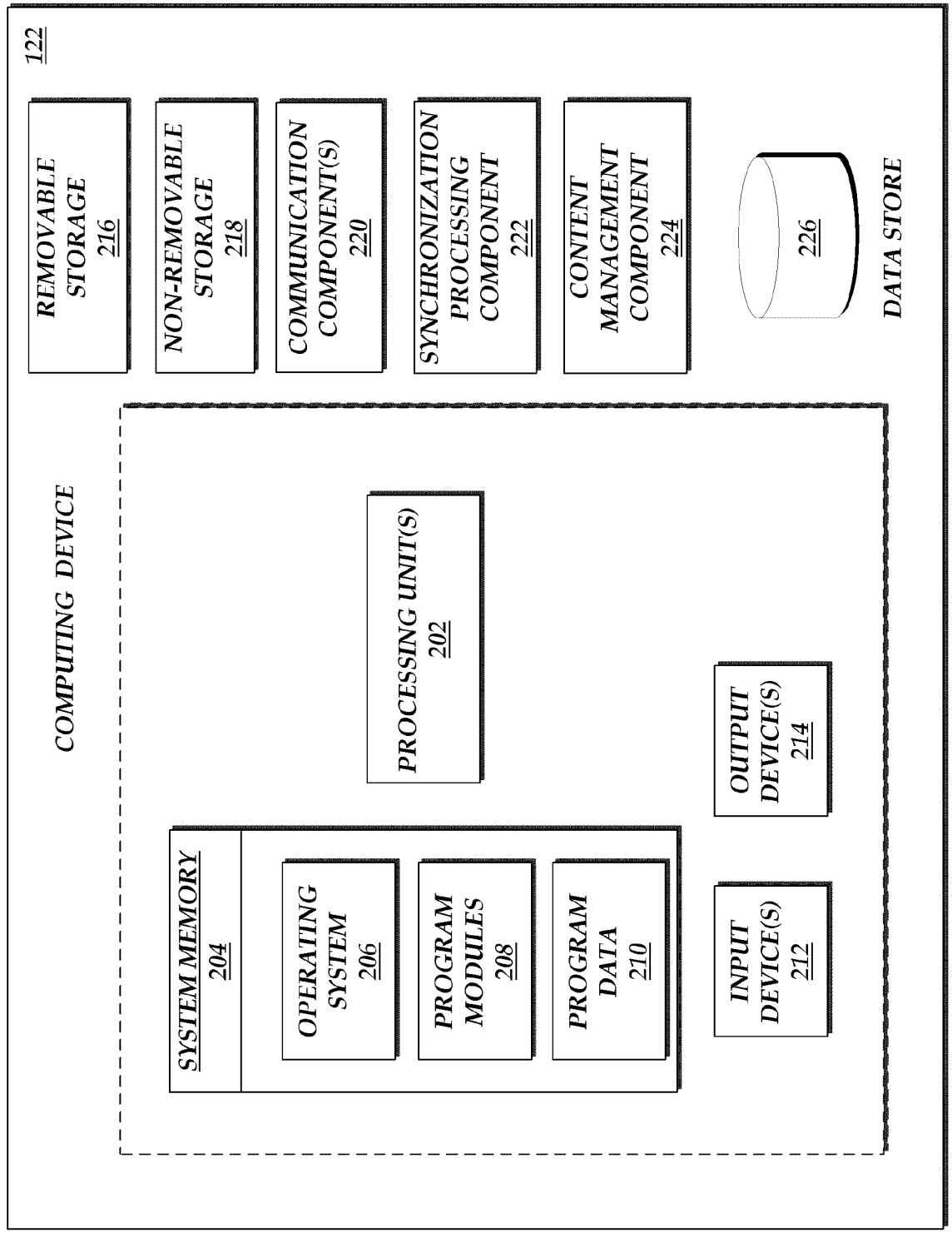
FIG. 2 is a block diagram illustrative of components of a device for use in sharing synchronization information based on a determination of a synchronization event.

With reference now to FIG. 2, illustrative components of a computing device 122 for collecting synchronization information and transmitting the collected synchronization information based on determination of a synchronization event will be described. The computing device 122 may include one or more processing units 202, such as one or more CPUs. The computing device 122 may also include system memory 204, which may correspond to any combination of volatile and/or non-volatile storage mechanisms. The system memory 204 may store information that provides an operating system component 206, various program modules 208, program data 210, and/or other components. The computing device 122 performs functions by using the processing unit(s) 202 to execute instructions provided by the system memory 204. The computing device 122 may also include one or more input devices 212 (keyboard, mouse device, specialized selection keys, etc.) and one or more output devices 214 (displays, printers, audio output mechanisms, etc.). Illustrative interfaces generated by a computing device 122, such as a wireless computing device 112, will be described below with regard to FIGS. 10-13.

With continued reference to FIG. 2, the computing device 122 may also include one or more types of removable storage 216 and one or more types of non-removable storage 218. Still further, the computing device 122 can include communication components 220 for facilitating communication via wired and wireless communication networks, such as the wireless communication network 114 and network 118 (FIG. 1). As will be explained in greater detail below, the computing device 122 can also include a synchronization processing component 222 for collecting synchronization information related to the presentation of content on the computing device 122. The synchronization processing component 222 may further be operative to determine synchronization events that result in the transmission of the collected synchronization information to the content management system 102. The synchronization events may be based on monitoring wireless device performance, obtaining inputs from users and/or obtaining information from external data sources.

In an illustrative embodiment, the computing device 122 may further include a content management component 224 for obtaining synchronization information from a device, or devices, serving as originating devices upon detection of a synchronization event. The content management component 224 can also determine one or more devices to serve as receiving devices and cause the transmission of at least a subset of the synchronization information to the receiving devices. Illustratively, the content management component 224 may have equivalent functionality as described with regard to the content management system 102 (FIG. 1). Alternatively, the content management component 224 may have more limited functionality and/or specialized functionality, such as functionality to implement peer-to-peer distribution. The computing device 122 may also be associated with a data store 226 for storing synchronization collection configuration information, synchronization event configuration information, configuration information regarding incorporation of received synchronization information, collected synchronization information, or various combinations of the above. The above enumerated list of components is representative and is not exhaustive of the types of functions performed, or components implemented, by the computing device 122. One skilled in the relevant art will appreciate that additional or alternative components may also be included in the computing device 122 to carry out other intended functions such as for an electronic book reader or a mobile telephone.

Figure 3A:
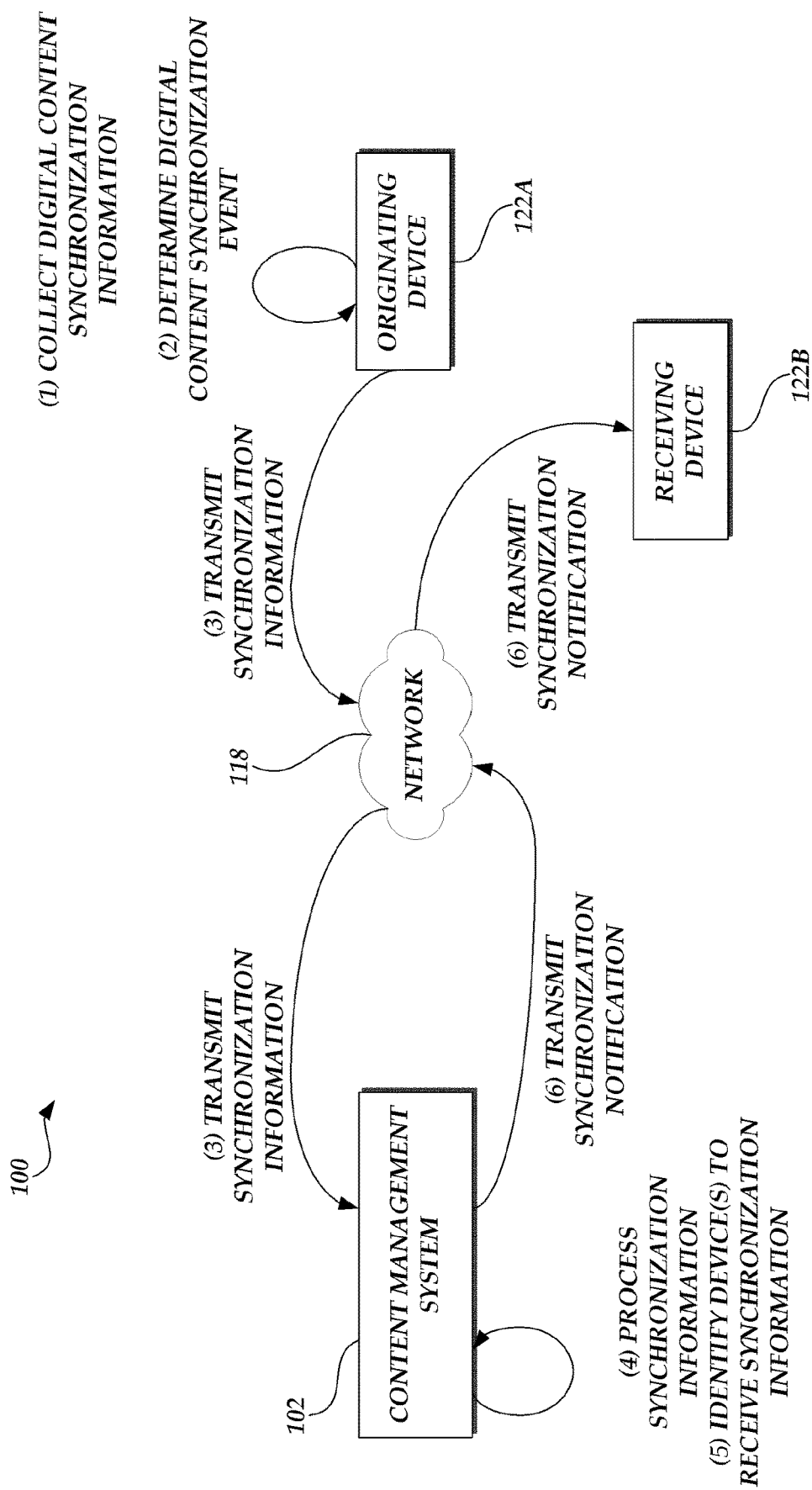
FIGS. 3A-3C are block diagrams of the content management environment of FIG. 1 illustrating various embodiments for the transmission of synchronization information based on a determination of a synchronization event.
Figure 3B:
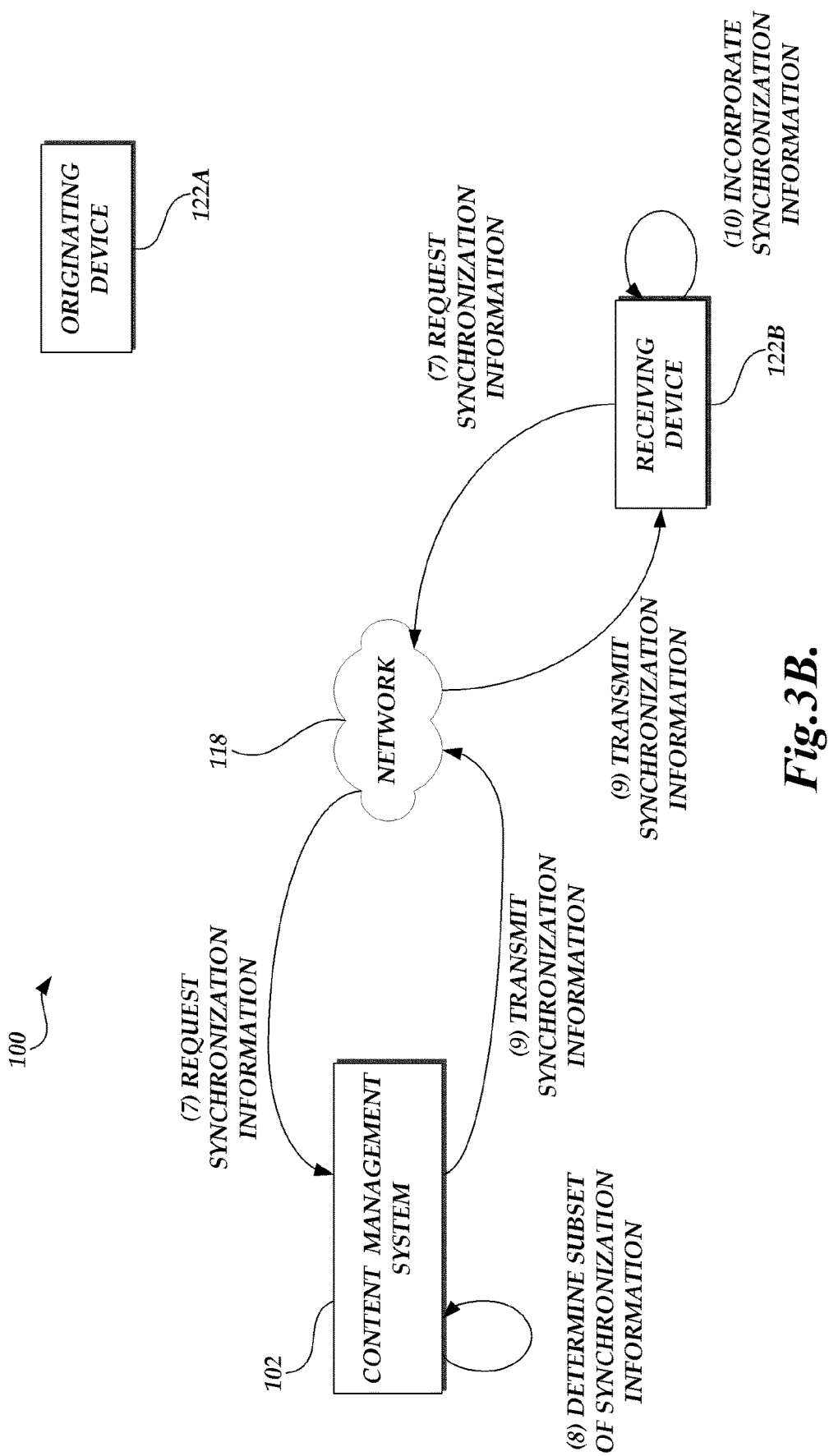
Figure 3C:
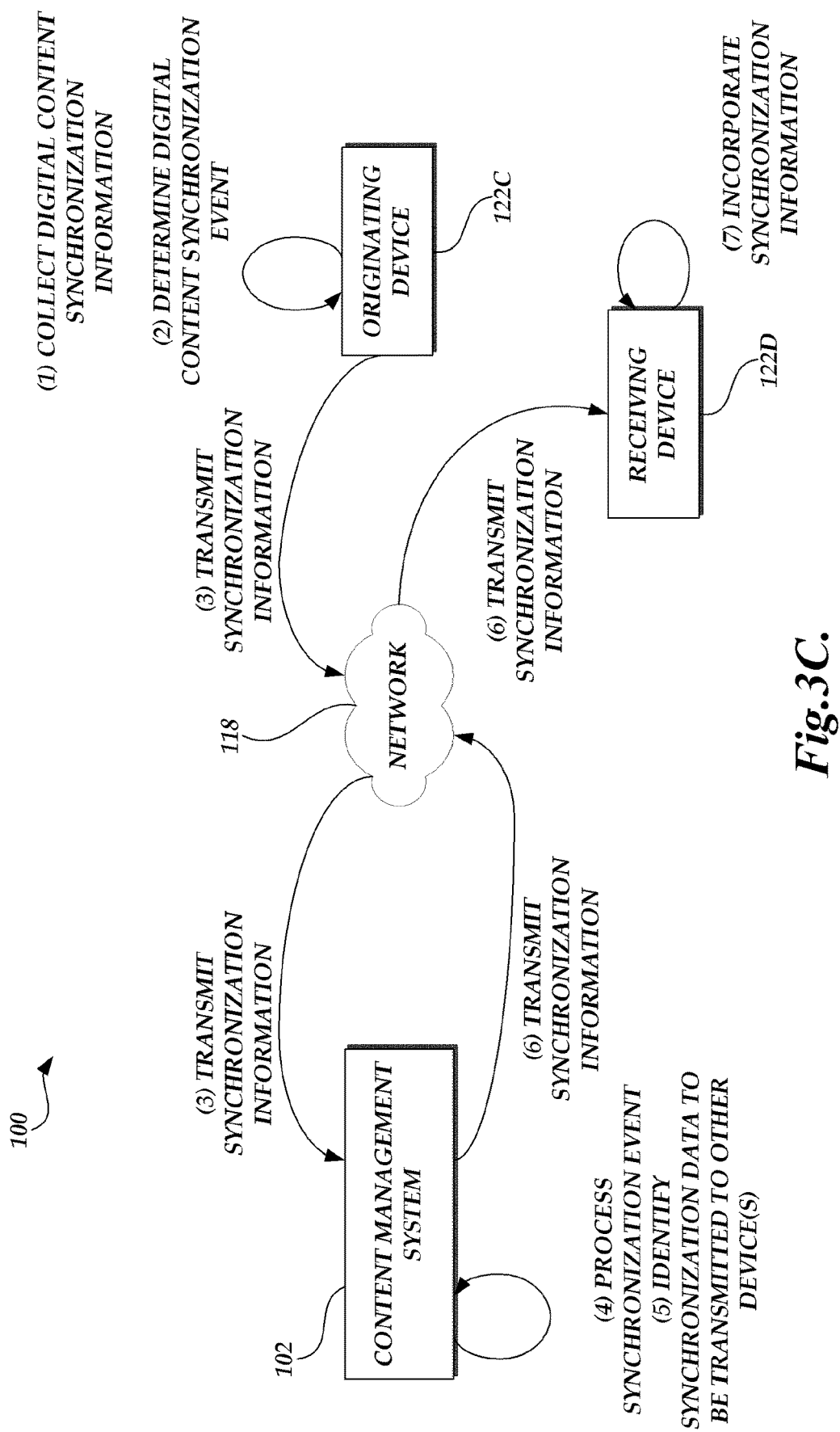

With reference to FIGS. 3A-3C, the interaction between the various components of the content management environment 100 (FIG. 1) will be described. With reference to FIG. 3A, in one embodiment corresponding to a "pull" model, a computing device 122A functions as an originating device and collects synchronization information related to the presentation of content to a user, or set of users. As previously described, the synchronization information is defined according to one or more reference points, or tracking points, associated with the presentation of the content. For example, the synchronization information can correspond to information associated with the current state of the presentation of the content to the user (e.g., last page read), additional information provided by the user or an external data source (e.g., annotations, bookmarks, highlights, comments, tags, excerpts, etc.), or a combination thereof.

In one embodiment, the originating computing device 122A continues to collect the synchronization information until a synchronization event is determined. Illustratively, the synchronization processing component 222 (FIG. 2) is configured with criteria utilized to determine particular synchronization events. As previously discussed, the criteria utilized to determine synchronization events can correspond to receipt of user-initiated commands, computing device performance metrics (e.g., power levels, communication levels, motion sensors, timers, detection of input/output devices, etc.), receipt of externally provided instructions or information, and the like. Each originating computing device 122A, or class of originating computing devices, may have different configurations for determining synchronization events based on characteristics of the device (e.g., power management for a wireless computing device 112) or custom configurations provided by a user or administrator.

Upon detection of the synchronization event, the originating computing device 122A transmits the collected synchronization information to the device interface component 106 of the content management system 102 via the communication network 118. The content management system 102 processes the synchronization information from the originating computing device 122A and identifies a set of one or more devices that should receive the synchronization information, serving as the receiving devices for the synchronization information. Illustratively, the content management system 102 identifies which devices have been registered, or otherwise associated with, a common user or common user account. Additionally, the content management system 102 optionally determines whether the receiving devices have access to a representation of the content (either locally stored or accessible via the communication network 118). Still further, the content management system 102 may utilize user specified or administrator specified configuration information in determining, or otherwise adjusting, the set of receiving devices. In accordance with a "pull" model, the content management system 102 transmits a notification to at least one receiving device (e.g., computing device 122B), indicating that synchronization information is available.

With reference now to FIG. 3B, the receiving computing device 122B, obtains the synchronization notification and transmits a request for the synchronization information to the content management system 102. The request can include additional information related to the configuration, capabilities, or functionality of the receiving computing device 122B. The additional information will be used by the content management system 102 to determine a subset of the synchronization information to be delivered to the receiving computing device 122B. Additionally, the request from the receiving computing device 122B can be transmitted based on the availability of the communication network 118, in accordance with other data transmission criteria, such as cost mitigation, power management, quality of service, and the like, alone or in combination.

The content management system 102 receives the request from the receiving computing device 122B and determines how much of the synchronization information (including at least a subset of the synchronization information) should be transmitted to the receiving computing device. Thereafter, the content management system 102 either transmits or causes the transmission of the synchronization information to the receiving computing device 122B. In turn, the receiving computing device 122B obtains the synchronization information (or a subset thereof) and incorporates the received synchronization information. The receiving computing device's 122B incorporation of the received synchronization information can include the incorporation, update or storage of progress information, any additional information, or a combination thereof. Additionally, the update of the digital content can include receipt of referenced information (such as referenced via a uniform resource identifier (URI)). For example, in the event that the receiving computing device 122B does not have a full copy of the content, the incorporation of the synchronization information can include the receiving computing device 122B obtaining relevant portions of the content (e.g., content corresponding to the next chapter of a publication). Still further, the incorporation of the synchronization information by the receiving computing device 122B can include performing conflict resolution of synchronization information received from multiple originating devices or with regard to the content previously maintained at the receiving computing device 122B.

With reference now to FIG. 3C, in another embodiment corresponding to a "push" model, an originating computing device 122C collects synchronization information related to the presentation of content to a user or set of users. The originating computing device 122C continues to collect the synchronization information until a synchronization event is determined. Upon determination of the synchronization event, the originating computing device 122C transmits the collected synchronization information to the device interface component 106 of the content management system 102 via the communication network 118. As previously described, the content management system 102 processes the synchronization information from the originating computing device 122C and identifies a set of one or more devices that should receive the synchronization information. As illustrated in FIG. 3C, receiving computing device 122D serves as the receiving devices for the synchronization information.

With continued reference to FIG. 3C, the content management system 102 then determines that the receiving computing device 122D should receive at least a subset of the synchronization information. Thereafter, the content management system 102 either transmits or causes the transmission of the synchronization information to a receiving computing device 122D. In turn, the receiving computing device 122D obtains the synchronization information (or subset thereof) and incorporates the received synchronization information. As previously described, the incorporation of the received synchronization information by the receiving computing device 122D can include the incorporation, update or storage of progress information or any additional information. Additionally, the update of the digital content can include receipt of referenced information. Still further, the receiving computing device's 122D incorporation of the synchronization information can include performing conflict resolution of synchronization information received from multiple originating devices or with regard to the content previously maintained at the receiving computing device 122D.

Figure 4A:
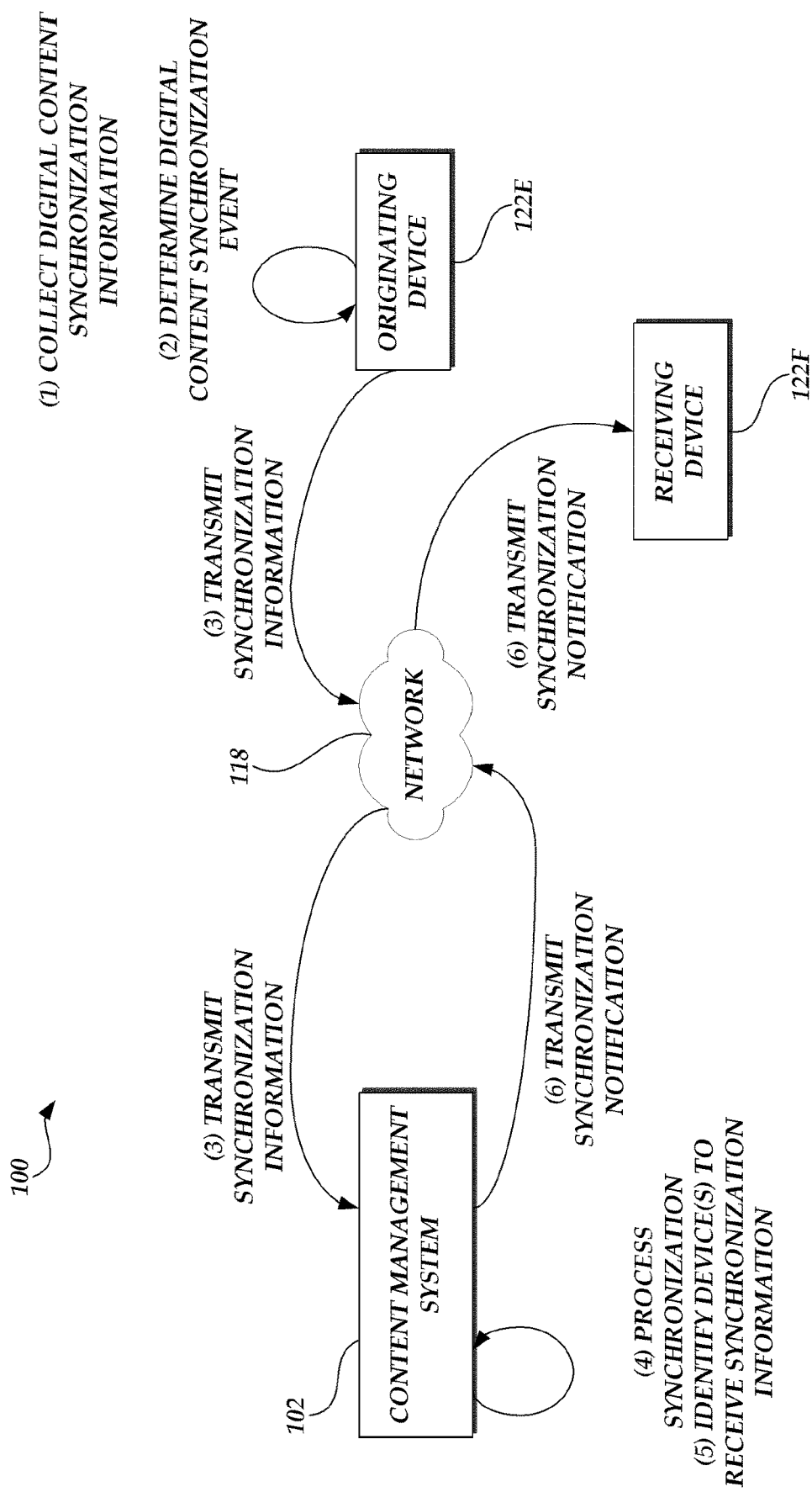
FIGS. 4A and 4B are block diagrams of the content management environment of FIG. 1 illustrating an embodiment for the transmission of synchronization information between peer devices based on a determination of a synchronization event.
Figure 4B:
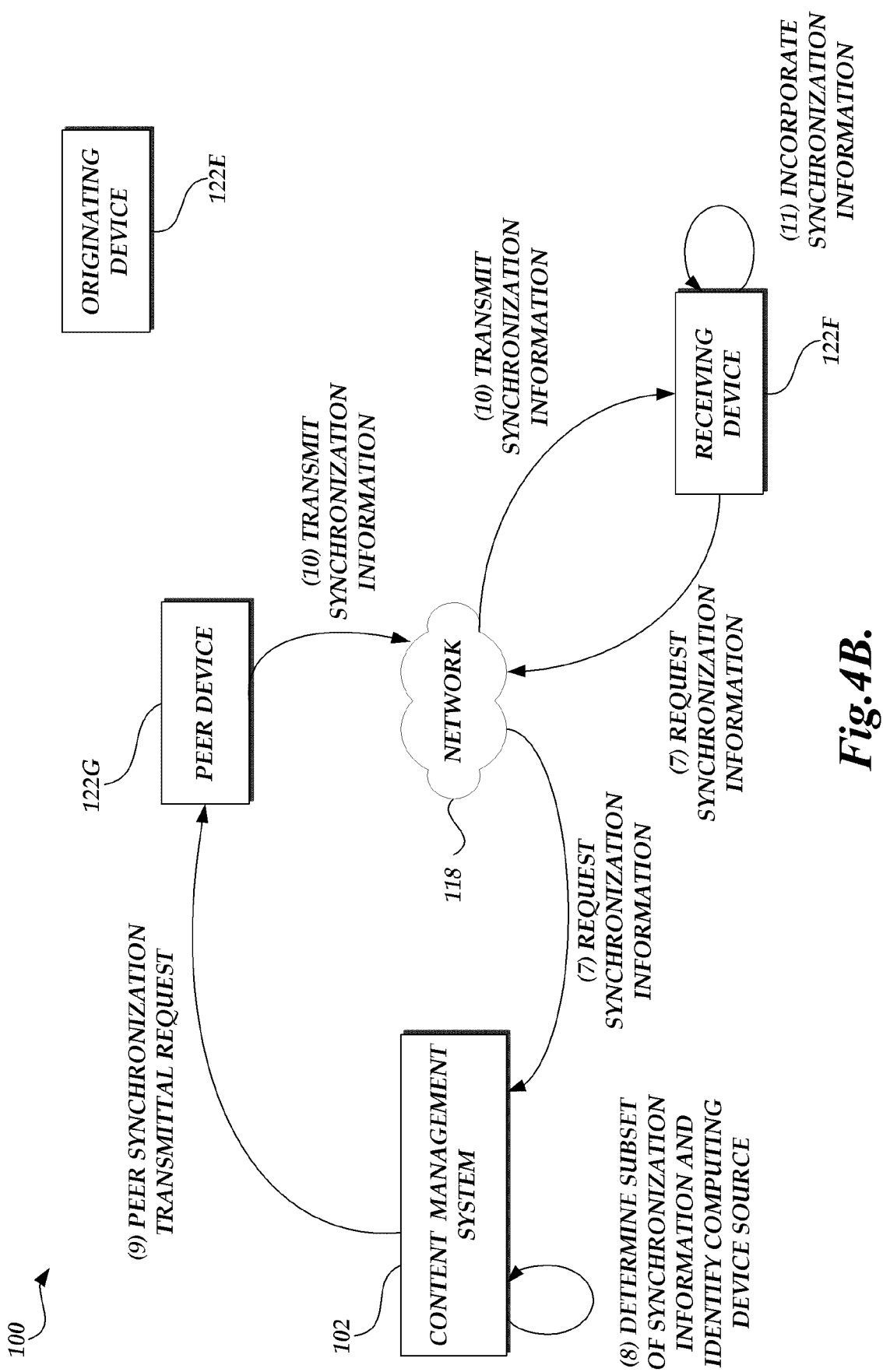

With reference to FIGS. 4A and 4B, the interaction between the various components of the content management environment 100 (FIG. 1) corresponding to a peer-to-peer distribution model will be described. With reference to FIG. 4A, similar to the interaction described with regard to FIG. 3, an originating computing device 122E collects synchronization information related to the presentation of content to a user or set of users. The originating computing device 122E continues to collect the synchronization information until a synchronization event is determined. Upon detection of the synchronization event, the originating computing device 122E transmits the collected synchronization information to the device interface component 106 of the content management system 102 via the communication network 118.

The content management system 102 processes the synchronization information from the originating computing device 122E and identifies a set of one or more devices that should receive the synchronization information. As illustrated in FIG. 4A, receiving computing device 122F serves as the receiving devices for the synchronization information. As previously described in FIG. 3B, the content management system 102 transmits a notification to at least one receiving computing device 122F indicating that synchronization information is available.

With reference now to FIG. 4B, the receiving computing device 122F, obtains the synchronization notification and transmits a request for the synchronization information to the content management system 102. As previously described, the request can include additional information related to the configuration, capabilities, or functionality of the receiving computing device 122F that is used by the content management system 102 to determine that the receiving computing device 122F should receive at least a subset of the synchronization information. Additionally, as previously described, the request from the receiving computing device 122F can be transmitted based on the availability of the communication network 118 or in accordance with other data transmission criteria, such as cost mitigation, power management, quality of service, and the like. The content management system 102 receives the request from the receiving computing device 122F and identifies the synchronization information that will be transmitted to the receiving computing device.

With continued reference to FIG. 4B, in accordance with a peer distribution model, the content management system 102 transmits a peer synchronization request to a peer computing device 122G. The peer synchronization request includes instructions requesting that the peer computing device 122G serve as a source of synchronization information to other devices in the content management environment 100. The peer synchronization request can include a copy of the synchronization information (or subset thereof) if the peer computing device does not already have the synchronization information. Although FIG. 4B illustrates the peer synchronization request being transmitted to a single, separate computing device (e.g., peer computing device 122G), the content management system 102 may transmit multiple peer synchronization requests, including a peer synchronization request to the originating computing device 122E. Accordingly, in one embodiment, a computing device may function as both an originating computing device 122E for collecting the synchronization information and a peer computing device for transmitting the synchronization information to receiving computing device(s) 122F. Upon processing the peer synchronization request, the peer computing device 122G transmits the synchronization information to the receiving computing device 122F. As described above, the receiving computing device 122F obtains the synchronization information (or subset thereof) and incorporates the received synchronization information.

Figure 5:
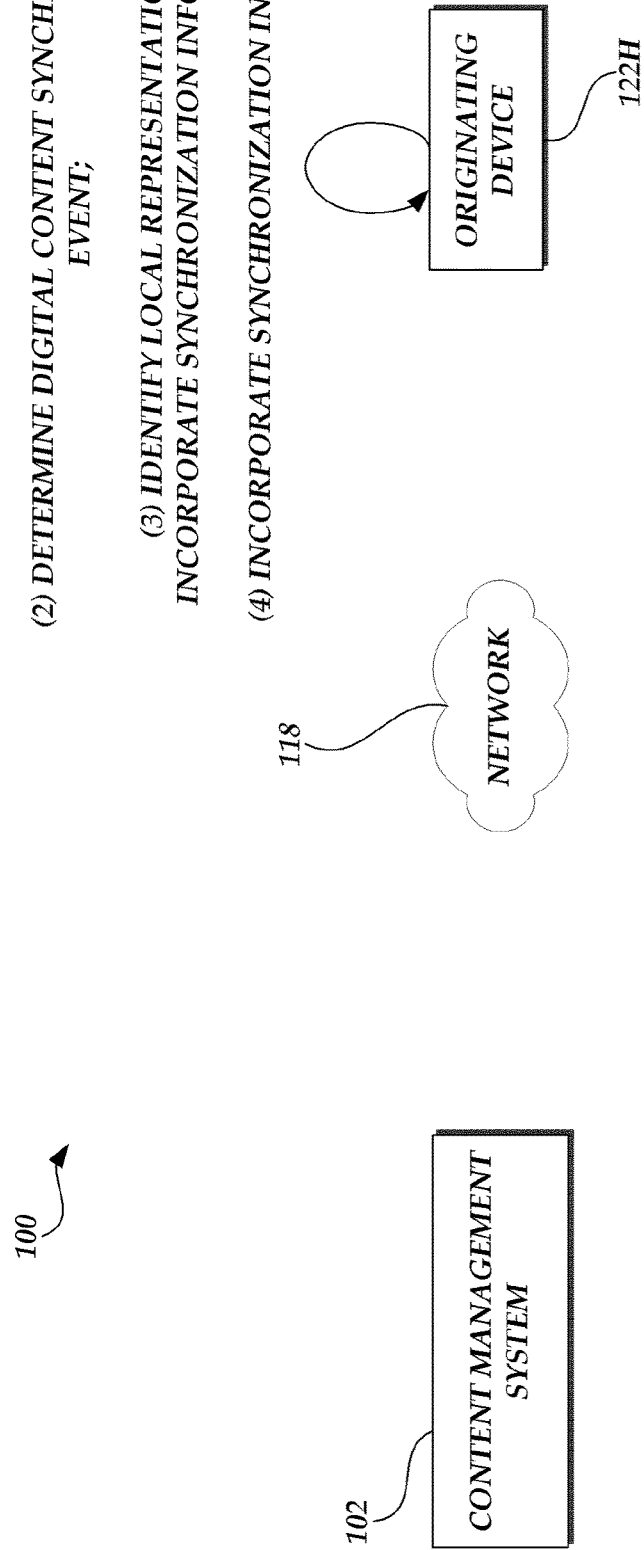
FIG. 5 is a block diagram of the content management environment of FIG. 1 illustrating an embodiment for processing a synchronization event by an originating computing device.

With reference to FIG. 5, an embodiment illustrating the internal processing of a synchronization event by an originating computing device 122H will be described. Similar to the interaction described with regard to FIGS. 3 and 4, an originating computing device 122H collects synchronization information related to the presentation of digital content to a user or set of users. The originating computing device 122H continues to collect the synchronization information until a synchronization event is determined. With reference to an illustrative example, the synchronization processing component 222 (FIG. 2) may detect that an output device 214, such as headphones, have been enabled on the originating computing device 122H. Accordingly, the synchronization processing component 222 may be configured to determine that the enablement of the output device 214 is a synchronization event because it may be indicative of a desire by the user to access the content via an audible representation of content as opposed to, or in addition to, a corresponding visual representation.

Upon detection of the synchronization event, the originating computing device 122H does not transmit the synchronization information to the content management system 102. Instead, the content management component 224 associated with the originating computing device 122H identifies one or more representations of the content on the originating computing device 122H, or otherwise accessible by the originating computing device 122H. Thereafter, the originating computing device 122H incorporates the received synchronization information to each of the identified representations of the content on the originating computing device 122H. With reference to the previous example, incorporation of the synchronization information may relate to the automatic initiation of a software application on the originating computing device 122H for presenting the audible representation of the content such that the content is cued according to the progress information included in the synchronization information. In such an embodiment, the content management component 224 may be required to translate, or otherwise process, the synchronization information so that it can be incorporated into different types of formats.

Figure 6:
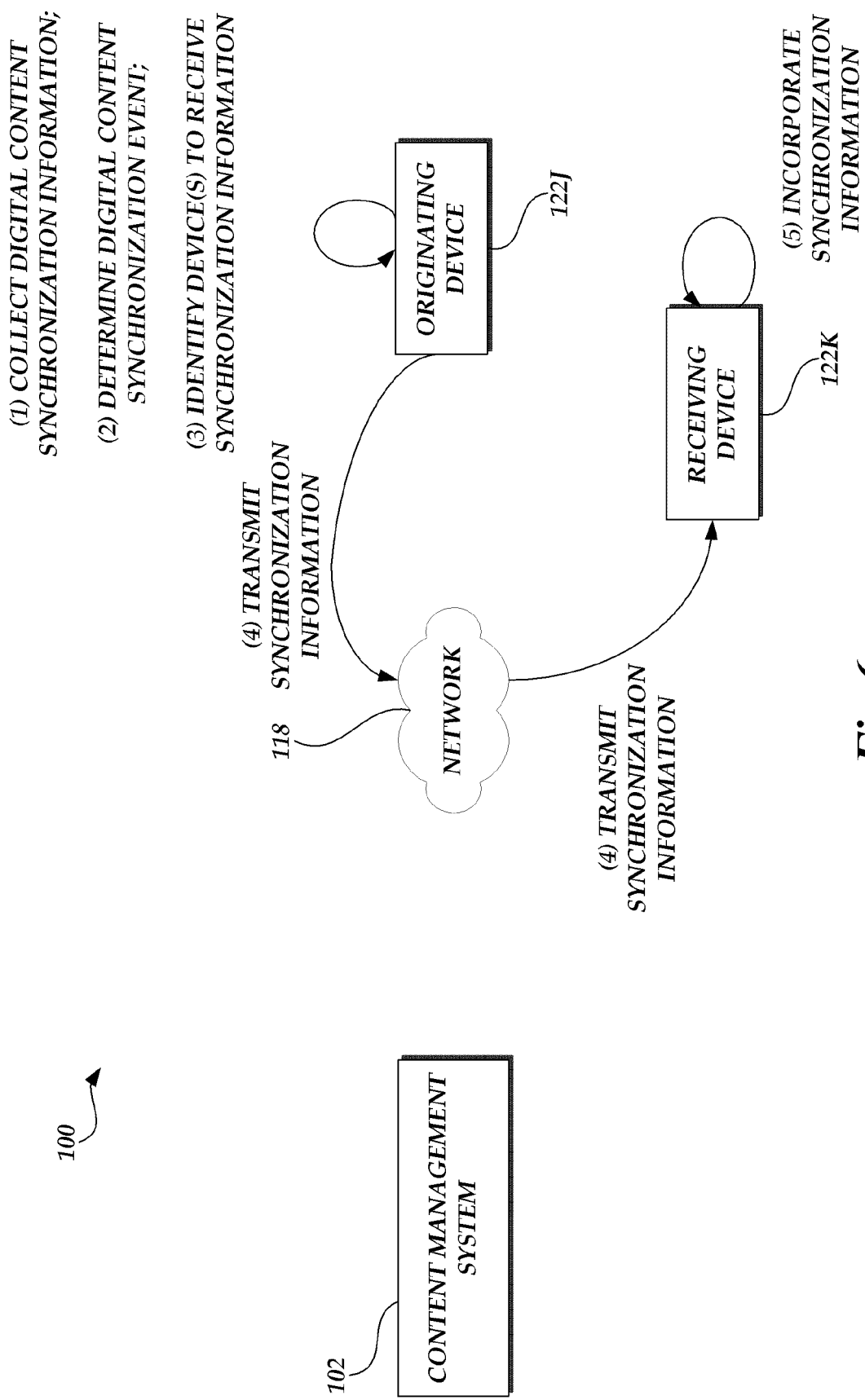
FIG. 6 is a block diagram of the content management environment of FIG. 1 illustrating an embodiment for the transmission of synchronization information between peer devices based on a determination of a synchronization event.

With reference to FIG. 6, the interaction between the various components of the content management environment 100 (FIG. 1) corresponding to another peer-to-peer distribution model will be described. Similar to the interaction described with regard to FIGS. 3-5, an originating computing device 122J collects synchronization information related to the presentation of digital content to a user or set of users. The originating computing device 122J continues to collect the synchronization information until a synchronization event is determined.

Similar to the interaction described with regard to FIG. 5, upon detection of the synchronization event, the originating computing device 122J does not transmit the synchronization information to a content management system 102. However, as illustrated in FIG. 6, the content management component 224 (FIG. 2) associated with the originating computing device 122J identifies a set of one or more receiving computing devices that should receive the synchronization information. As previously described, the request can include additional information related to the configuration, capabilities, or functionality of the receiving computing device 122K that will be used by the content management system 102 to determine that the receiving computing device 122K should receive at least a subset of the synchronization information. Thereafter, the originating computing device 122J transmits the synchronization information to the receiving computing device 122K.

As described above, the receiving computing device 122K obtains the synchronization information (or subset thereof) and incorporates the received synchronization information. One skilled in the relevant art will appreciate that the peer distribution model illustrated in FIG. 6 could be repeated such that each receiving computing device (e.g., receiving computing device 122K) would become an originating computing device for transmitting the synchronization information to other devices known to the computing device. In this alternative embodiment, each content management component 224 (FIG. 2) would not be required to maintain an exhaustive list of all potential receiving computing devices. Rather, the synchronization information would be propagated through multiple peer-to-peer transmissions.

Figure 7:
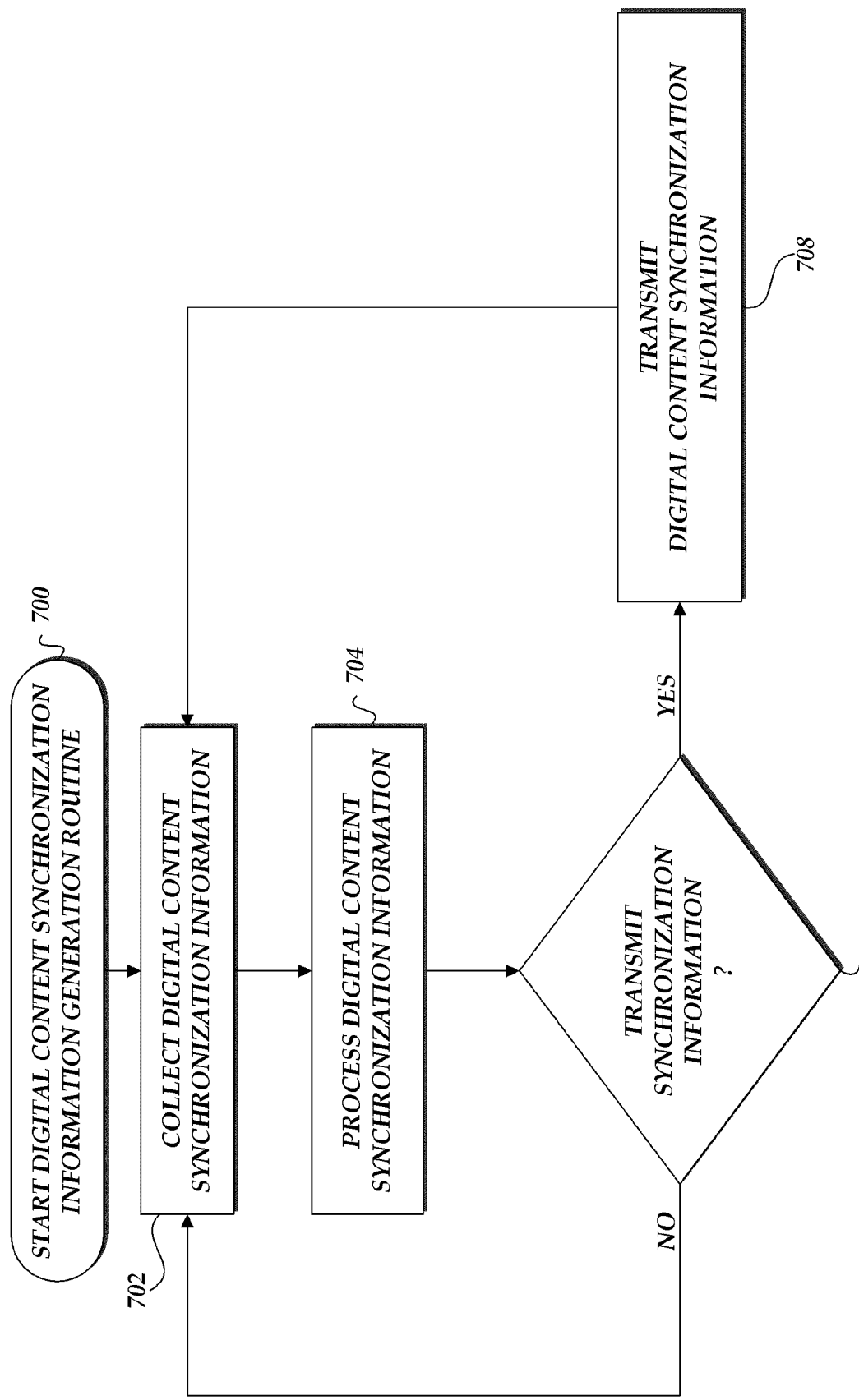
FIG. 7 is a flow diagram of a content synchronization information generation routine implemented by a device for transmitting synchronization information based on a determination of a synchronization event.

With reference now to FIG. 7, a flow diagram illustrative of a content synchronization information generation routine 700 implemented by an originating computing device 122 for transmitting synchronization information based on a determination of a synchronization event will be described. At block 702, the synchronization processing component 222 (FIG. 2) of the originating computing device 122 collects content synchronization information associated with the presentation of content to a user. As previously described, the synchronization information can include information tracking the current state of the presentation of the content to the user (e.g., last page, paragraph, or word presented to the user), additional information provided by the user or an external data source (e.g., annotations, bookmarks, highlights, comments, tags, excerpts, etc.), or a combination thereof. For example, the additional information can include portions of previously presented content selected by a user, such as via cut and paste functionality. In another example, the additional information can include geocoding information, such as global position system (GPS) information, that can be obtained from an appropriate sensor or component and attributed to a reference point within the representation of the content. As also described above, the synchronization information is illustratively defined according to reference points, or tracking points, in the content. Illustratively, the reference points or tracking points may vary according to the type and format of content, including but not limited to, chapter number, section number, page number, paragraph number, word groupings (e.g., blocks of words), word number/word count, time of play, timestamps, track number, and the like. Still further, the reference point or tracking point information may be hierarchically organized to facilitate multi-level sorting. For example, each word in a representation of content may be labeled with a word count within the content, as well as a chapter count, sentence count, etc.

In an illustrative embodiment, the reference point information associated with the presentation of content may be represented by a progress information data structure. As applicable, the progress information data structure may include multiple fields for specifying aspects of progress information. The fields can include a previous position field, a current position field, a timestamp field, and a played-through indicator field, and other bookmark field (although more, or less, fields may be used, if desired). The previous position field may include reference information which defines the point from which the current position field is being updated. The current position field can correspond to multi-media content for indicating a current playback position within the multi-media content. The current playback position may correspond to digital representation of units of time (seconds) from a starting point. For example, this field may specify a value such as 360 seconds, in which case the playback device increments the playback pointer 6 minutes from the starting point of the content as the current playback position. The timestamp field indicates a time at which the progress information was collected, stored or otherwise processed. The played-through indicator field indicates whether the end of the content has been presented to a user, such as a flag. The other bookmark field may include data relating one or more other bookmarks placed or updated in the content by the user during the consumption session.

At block 704, the synchronization processing component 222 processes the synchronization information. In one embodiment, the synchronization processing component 222 can process the synchronization information by applying filtering, spell/grammar check, and any other algorithms. Additionally, the synchronization processing component 222 can incorporate additional referenced materials, such as by accessing a URI, or incorporating information previously stored on the originating computing device 122. Still further, the synchronization processing component 222 can translate or otherwise process the collected synchronization information. For example, if the collected synchronization information corresponds to information related to the presentation of a specific representation of content (e.g., page number as viewed on a particular originating device), the synchronization processing component 222 may translate the synchronization information into a generic format applicable to different representations of the content or into a format specific for a different representation of the content (e.g., track information for a video or timestamp information for streaming content).

At decision block 706, a test is conducted to determine whether a synchronization event has occurred. As previously described, the synchronization processing component 222 is configured with criteria utilized to determine particular synchronization events. As previously discussed, the criteria utilized to determine the occurrence of a synchronization event can correspond to the processing of user interaction information, computing device performance metrics, externally provided instructions or information, and the like. By way of non-limiting examples, the determination of a synchronization event can correspond to a likelihood that synchronization information is available, the availability of a network connection to transmit data, the anticipated unavailability of the originating device in the future, and various combinations thereof. Additionally, examples of user interaction include, but are not limited to, selection of a power off switch or power off function, disabling a communication component, such as a wireless modem, etc., selecting a limited communication mode on the wireless device, docking a portable computing device to a computing device or power supply, and the like. One skilled in the relevant art will appreciate that the user interaction events can correspond to physical interactions with the originating computing device 122, voice or other interactive commands, remote interactions, and the like.

The computing device performance metric information can include various attributes of the originating computing device 122 including battery power information, battery power consumption rates, wireless signal strength, overall device health information, device or ambient temperature values, and the like. The performance metric information can also include information related to the status of various input or output devices or information regarding a change in status of input or output devices. For example, performance metric information can include information indicative of the connection of a portable device with a consumer device in a vehicle (e.g., via a Bluetooth wireless connection or hardwire connection). Similarly, the performance metric information can include information related to the instantiation of one or more software applications on the originating device. For example, performance metric information can include an identification of any software application having functionality to present content to a user. In an illustrative embodiment, the performance metric information may be generated by hardware components (e.g., sensors) or software components on the originating computing device 122. Additionally, the performance metric information may be obtained by the originating computing device 122 from external resources, such as attached hardware components, remote monitoring components/services or network data sources 120. For example, performance metric information can correspond to information (such as latitude and longitude information or other geographic coordinate information) from a global positioning system ("GPS") or cellular positioning system (e.g., triangulation).

Illustratively, each device, or class of devices, may have different configurations for determining synchronization events based on characteristics of the device (e.g., power management for wireless devices) or custom configurations provided by a user or administrator. For example, a wireless computing device 112 may be configured to preserve battery consumption by limiting the number of synchronization events that can be determined.

If a synchronization event is determined at decision block 706, the originating computing device 122 transmits the digital content synchronization information at block 708. In one illustrative embodiment (as discussed above with regard to FIGS. 3 and 4), the computing device 122 transmits the collected synchronization information to the content management system 102 (FIG. 1) for distribution to receiving devices. In another embodiment (as discussed above with regard to FIG. 5), the originating computing device can also apply the synchronization information internally to other representations of the content stored on, or accessible to, the originating computing device 122. The originating computing device can apply the synchronization information internally in addition to transmitting the synchronization information to the content management system 102 or in lieu of transmitting the synchronization information. In a further embodiment (as discussed above with regard to FIG. 6), the originating computing device 122, via the content management component 224 (FIG. 2), transmits the synchronization information directly to the receiving devices in a peer distribution model. Once the synchronization information has been transmitted at block 708 or if no synchronization event is detected, the routine 700 returns to block 702. Thus, the originating computing devices 122 can continuously collect and transmit synchronization information as appropriate.

Figure 8:
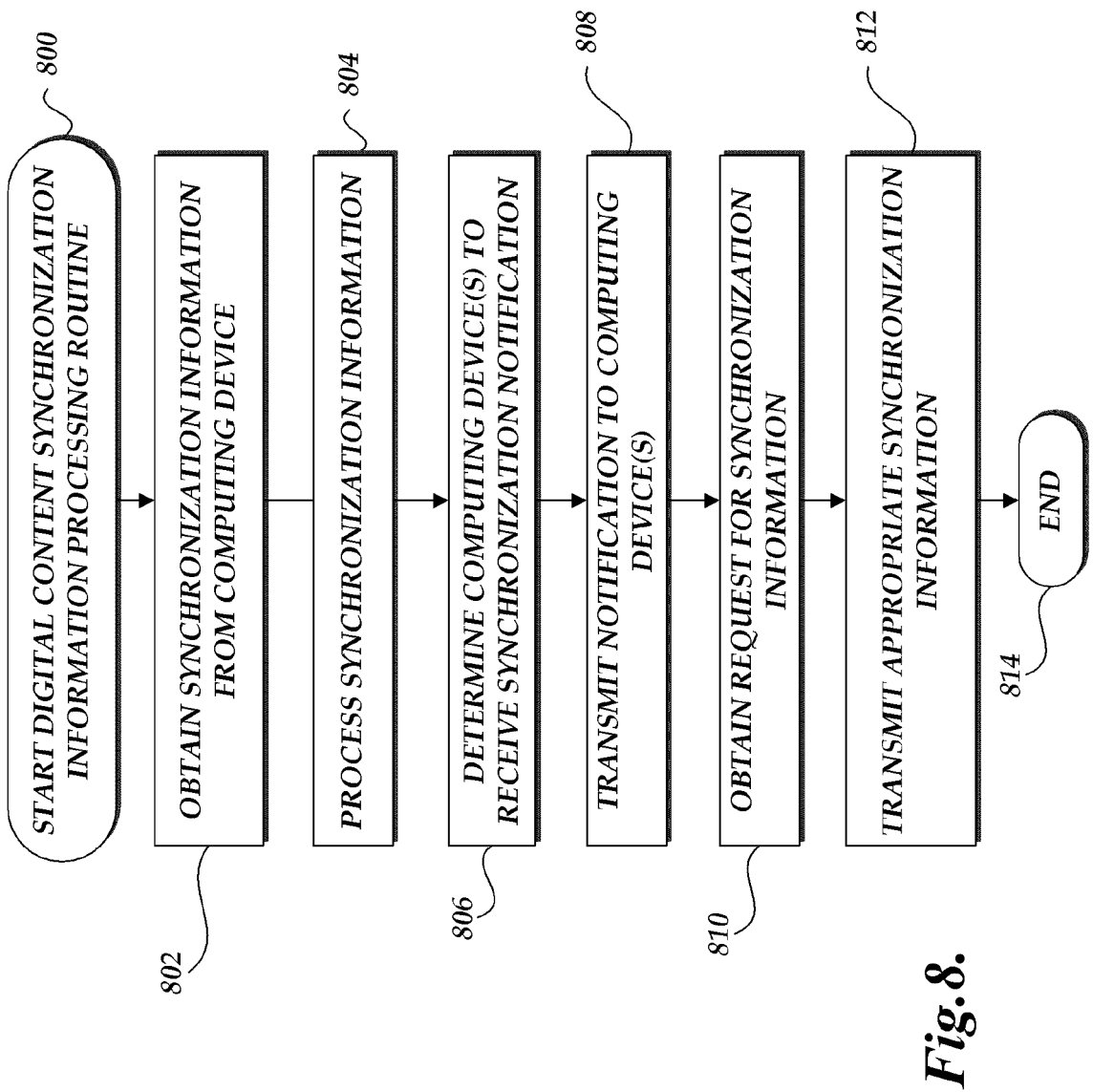
FIG. 8 is a flow diagram of a content synchronization information processing routine implemented by a content management component for processing and transmitting synchronization information.

With reference now to FIG. 8, a flow diagram illustrative of a content synchronization information processing routine 800 implemented by the content management system 102 (FIG. 1) for processing and transmitting synchronization information will be described. Although routine 800 will be described with regard to implementation by the content management system 102, one skilled in the relevant art will appreciate that at least some portion of routine 800 may be implemented by the content management component 224 as appropriate. At block 802, the device interface component 106 of the content management system 102 obtains synchronization information from an originating computing device 122. At block 804, the data processing component 108 processes the synchronization information and determines one or more computing devices to receive the synchronization information at block 806. Illustratively, the data processing component 108 processes the synchronization information to determine user or account identification information, identify any specific instructions related to the transmission of the synchronization information (e.g., an identification of specific computing device to receive the synchronization information), or any combination of the above. The data processing component 108 can also translate or otherwise process the collected synchronization information to a generic format or a format specific to a representation of the content.

In an illustrative embodiment, the data processing component 108 can modify the progress information included in the synchronization information. For example, the data processing component 108 can adjust the progress information backwards such that a portion of previously presented content is replayed to remind or refresh the user's memory. In some embodiments, the portion of content replayed may be a function of the time between replay intervals. For example, if a user consumes content on the originating computing device 122, and shortly thereafter resumes consumption with a receiving computing device 122 (e.g., ten minutes later), the replay period may be relatively short (e.g., ten seconds of audio content, one page of textual content, etc.). If the user resumes replay two days later, the replay period may be somewhat longer (e.g., thirty seconds of audio content, one chapter of textual content, etc.).

As previously described, to determine which computing devices will be receiving computing devices, the data processing component 108 determines whether the receiving device has been registered, or otherwise associated with, a common user or common user account. In an illustrative embodiment, a user, or system administrator, can dynamically update the list of registered receiving devices that are eligible to receive synchronization information. For example, a user can be presented with a screen interface that allows the user to select which receiving devices are eligible to receive synchronization information or to specify subsets of synchronization information to be received. Further, in an alternative embodiment, the content management system 102 can facilitate the temporary association of one or more receiving devices. For example, a user may rent a car and wish to use it as a receiving device during the time period of the car rental. In this case, the user may temporarily add this receiving device by registering it with the content management system 102. Accordingly, upon registration and initialization, the user may consume content. Additionally, to the extent the content is not available in the temporary receiving devices, portions of the content may be provided to the temporary receiving device. After the user is finished with that device (e.g., returns the rental car), the device may be unregistered, and the user's content, bookmark and playback information is consulted for any updates or usage data and statistics (discussed in more detail below) and may be subsequently deleted from the playback device. Illustratively, the temporary device may be configured to determine that the unregistration of the device corresponds to a synchronization event.

Additionally, the data processing component 108 optionally determines whether the receiving devices have access to a representation of the content (either locally stored or accessible as streamed content via the communication network 118). For example, the data processing component 108 can maintain a table of content known to be stored at each potential receiving device. Alternatively, the data processing component 108 can poll one or more devices to attempt to match content titles, identifiers, stock keeping units, product identifiers, etc. Still further, the data processing component 108 can further incorporate any specific processing instructions that include or exclude one or more devices. For example, a user may have previously configured certain devices associated with the account to not receive synchronization information, that certain types of content should not be synchronized (e.g., content corresponding to periodicals), or combinations thereof.

In accordance with a "pull" model, at block 808, the device interface component 106 transmits a notification to one or more of the receiving devices previously identified at block 806. Illustratively, the synchronization notification transmitted to the computing devices 122 can include an identification of the type of synchronization content (e.g., progress or additional information) that is available to the receiving computing device(s). Thereafter, at block 810, the device interface component 106 obtains requests from receiving computing devices 122 for the synchronization information that is responsive to the previously transmitted notification. One skilled in the relevant art will appreciate that for a "push" model (as described above with regard to FIG. 3C), routine 800 may be implemented with the omission of blocks 808 and 810.

At block 812, the content management system 102 transmits or causes the transmission of the synchronization information to the requesting receiving computing devices 122. Prior to the transmission, the data processing component 108 can determine whether it is appropriate to transmit only a subset of the synchronization information to specific computing devices 122 based on characteristics of the synchronization information/content or characteristics of the computing device. In one aspect, the synchronization information can include content that cannot be processed by a receiving computing device (e.g., based on versions/availability of software applications, available memory/resources, etc.) or expressly rejected by the receiving computing device. In another aspect, the format/version of the content may be such that the synchronization information may not be applicable. For example, synchronization information corresponding to digital annotations or highlights may not be transmitted to a consumer electronics based receiving computing device 122 in which the digital content is presented as streamed audible content (unless the device includes text-to-speech capabilities). Likewise, a receiving device having an earlier version of a publication may still receive synchronization information associated with a later version of the publication, but only for those portions in common.

In still a further embodiment, the data processing component 108 can process the synchronization information to minimize or reduce conflicting or incompatible synchronization information. In one aspect, the data processing component 108 may simply choose the synchronization information that is associated with the latest time of collection. In another aspect, the data processing component 108 may select the synchronization information that indicates the lesser amount of content consumed (so that although the user may have to again consume certain content, little or none would be missed). A third approach may involve the data processing component 108 verifying the synchronization information to determine whether the collected synchronization information is most accurate. As will be described in greater detail below, a fourth approach includes sending an error message identifying each playback device, the content selection affected, and its associated position information, and asking the user to select the most appropriate one. At block 814, the routine 800 terminates.

Figure 9:
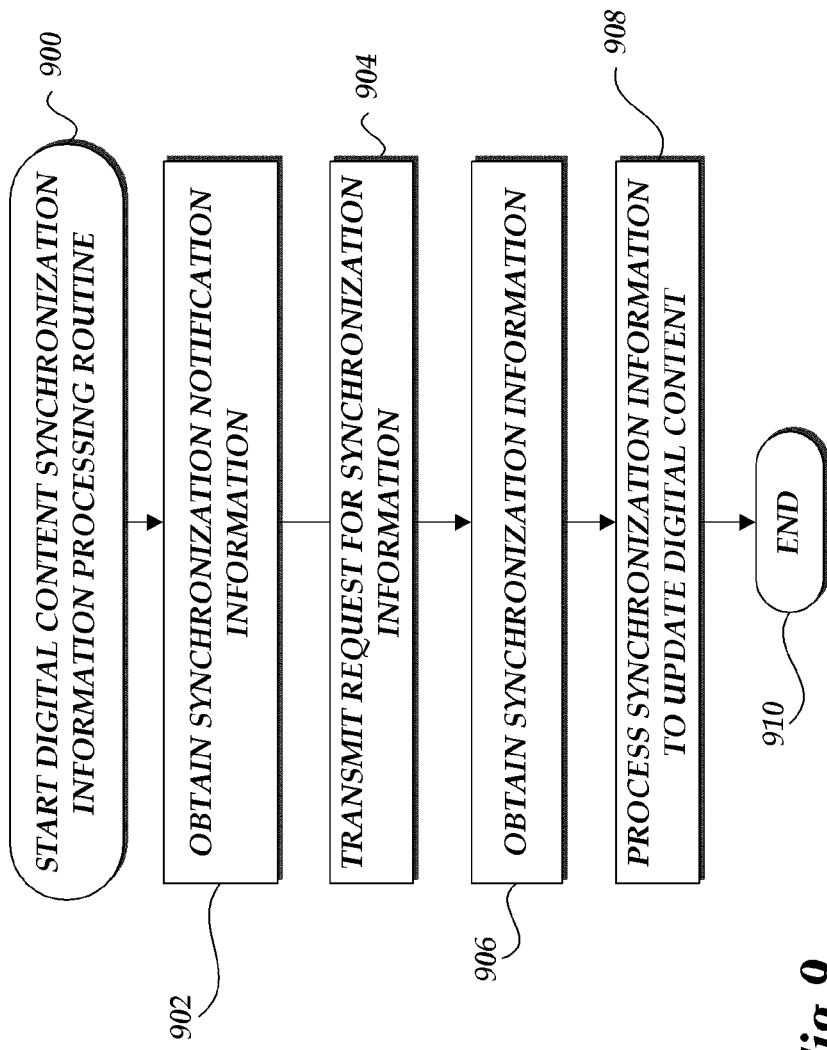
FIG. 9 is a flow diagram of a content synchronization information processing routine implemented by a device for incorporating synchronization information associated with content accessible by the device.

With reference now to FIG. 9, a flow diagram illustrative of a content synchronization information processing routine 900 implemented by a receiving computing device 122 for updating content based on received synchronization information will be described. At block 902, the receiving computing device 122 obtains a synchronization information notification from the content management system 102. If the synchronization information is desired, at block 904, a request for synchronization information is transmitted to the content management system 102. Illustratively, the receiving computing device 122 may be preconfigured to automatically process notifications in accordance with criteria specified by a user or administrator. For example, the receiving computing device 122 can process notifications by determining whether a representation of the corresponding content is stored, or otherwise available, to the receiving computing device. If so, the receiving computing device 122 can request the synchronization information. Additionally, the receiving computing device 122 can also generate a screen interface prompting a user regarding a decision whether to request specific synchronization information. One skilled in the relevant art will appreciate that for a "push" model (as described above with regard to FIG. 3C), routine 900 may be implemented with the omission of blocks 902 and 904.

Thereafter, at block 906, the receiving computing device 122 obtains synchronization information from the content management system 102. At block 908, the receiving computing device processes the synchronization information to incorporate the synchronization information. In one aspect, if the synchronization information has not been previously filtered by the content management system 102 (such as if the originating computing device is internally processing the collected synchronization information), the receiving computing device 122 can filter portions of the synchronization information that are not applicable to the specific representation of the content accessible to the receiving computing device 122 or that have been specifically configured to be excluded, or otherwise ignored, by the receiving computing device 122. For example, the receiving computing device 122 may be configured to ignore synchronization information obtained for content not accessible by the receiving computing device. The receiving computing device 122 can utilize identification information included in the synchronization information, such as SKU, product identifiers, version identifiers, to determine whether the synchronization information should be incorporated.

As previously described, the incorporation of the received synchronization information can include the incorporation, update or storage of progress information or additional information. Additionally, the update of the digital content can include receipt of referenced information. Still further, the incorporation of the synchronization information can include performing conflict resolution of synchronization information received from multiple originating devices or with regard to the content previously maintained at the receiving computing device 122. In one embodiment, the receiving computing device may generate a screen interface notifying a user of the receipt of the synchronization information. Such a screen interface may provide the user the ability to control the incorporation of the received synchronization information or to resolve conflicting or inconsistent synchronization information. In another embodiment, the receiving computing device 122 may be configured, such as by a user or system administrator, with information that enables the receiving device to automatically perform the synchronization information processing (including conflict resolution processing) without requiring additional user interaction. At block 910, the routine 900 terminates.

Figure 10:
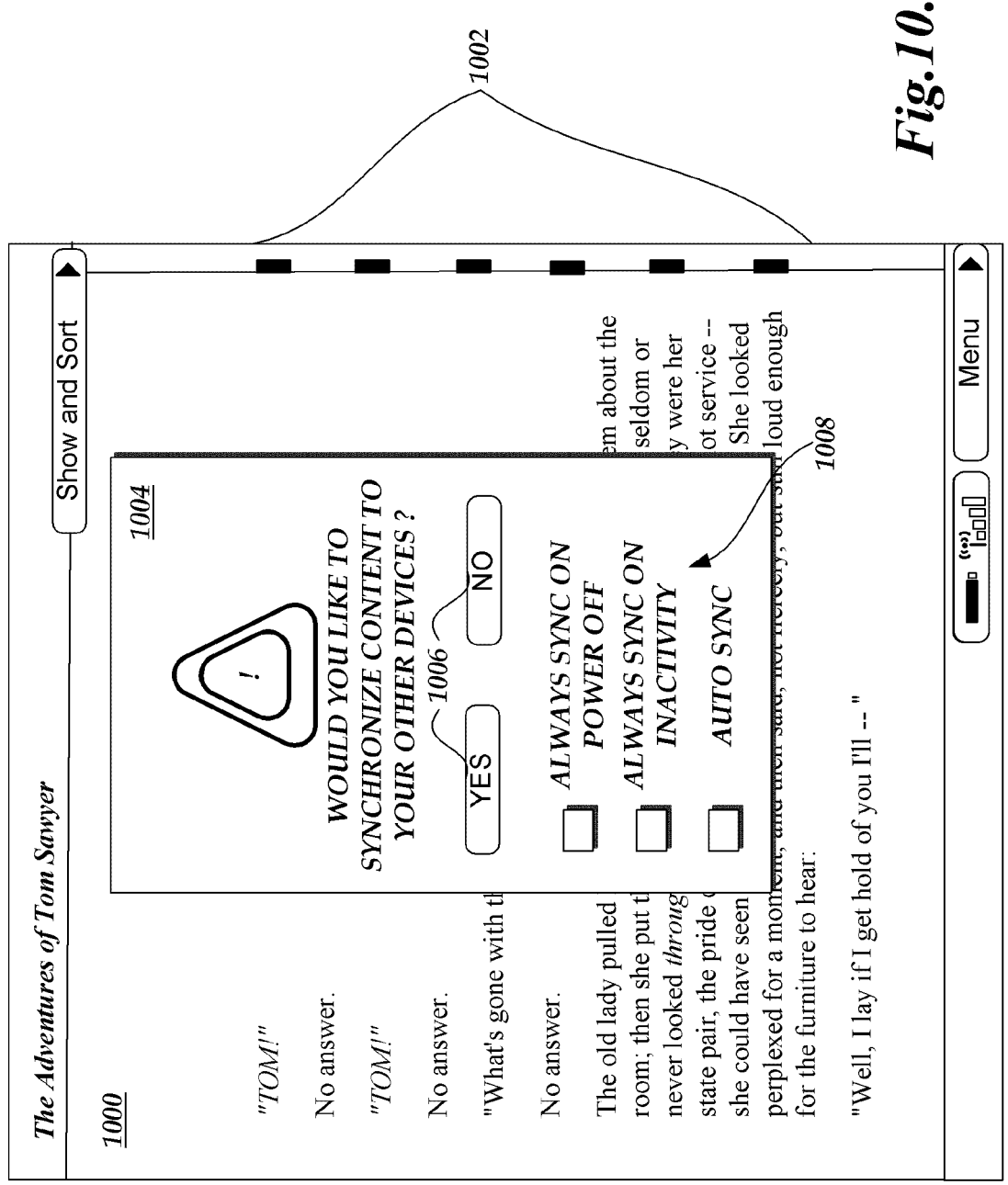
FIG. 10 is an illustrative interface generated on a wireless device for configuring the transmittal of synchronization information based on a determination of a synchronization event.

FIG. 10 is an illustrative interface 1000 generated on a computing device 122, such as a wireless device 112, for configuring the transmittal of synchronization information based on a determination of a synchronization event. The interface 1000 includes a first portion 1002 corresponding to the presentation of content, such as via a display. As previously described, in one embodiment, upon detection of a synchronization event, the wireless device 112 may prompt a user to confirm a desire to synchronize content or to configure future synchronization events. As illustrated in FIG. 10, the interface 1000 includes a second portion 1004 that serves as a notification indicative of the detection of a synchronization event. Additionally, the second portion includes a control 1006 for obtaining a confirmation of a desire to synchronize content. Still further, the second portion 1004 includes a configuration component 1008 for obtaining user input regarding the modification of the criteria utilized to determine a synchronization event. Although FIG. 10 has been illustrated with regard to a combination of confirmation and configuration functionality, one skilled in the relevant art will appreciate any number of separate or combined interfaces can be used to collect the confirmation information or configuration information. Additionally, although interface 1000 is illustrated with regard to a display screen of a wireless device 112, the interface 1000 may be generated by any type of computing device 122 and modified in accordance with resources associated with such alternative computing devices.

FIGS. 11A and 11B are illustrative interfaces 1100 and 1150 generated on a computing device 122, such as a wireless device 112, for configuring the updating of digital content based on receipt of synchronization information. With reference to FIG. 11A, the interface 1100 includes a first portion 1102 corresponding to the presentation of content, such as via a display. In this illustrative example, the content is initially presented at the first reference point (e.g., the first page of the publication). As illustrated in FIG. 11A, the interface 1100 includes a second portion 1104 that serves as a notification indicative of the receipt of a synchronization event from a content management system 102 or peer computing device 122. The second portion 1104 includes a control 1106 for obtaining a confirmation of a desire to synchronize content on the wireless device with the received synchronization information. Still further, the second portion 1104 includes configuration components 1108-1114 for obtaining user input regarding future synchronization configurations. Specifically, the second portion 1104 includes a component 1108 for toggling whether to exclude one or more associated devices from receiving synchronization information, as well as a listing of the specific associated devices 1110-1114 for collecting specific synchronization instructions. The specific synchronization instructions may be transmitted by the wireless device 112 with the next transmittal of synchronization information. Although FIG. 11A has been illustrated with a combination of confirmation options regarding the updating of content and additional configuration functionality, one skilled in the relevant art will appreciate that any number of separate or combined interfaces can be used to collect the confirmation information or configuration information. Additionally, although interface 1100 is illustrated with regard to a display screen of a wireless device 112, the interface 1100 may be generated by any type of computing device 122 and modified in accordance with resources associated with such alternative computing devices.

With reference now to FIG. 11B, the interface 1150 includes a portion 1152 corresponding to the presentation of a menu or other interface specifically for configuring the sharing of synchronization information between devices. Portion 1152 includes three controls 1154, 1156, 1158 for obtaining user input as to whether associated devices should receive synchronization information. The identification of the devices may be based on user profile information or the identification of specific devices by the user. As illustrated in FIG. 11B, portion 1152 also includes two additional controls 1160, 1162 to obtain user input as to whether a selected device should receive synchronization information for selected types of content. Accordingly, portion 1152 can facilitate the selection as to the sharing of synchronization information for specific types of content. Moreover, although not illustrated in FIG. 11B, an interface could include additional controls to facilitate the configuration of the sharing of synchronization information related to the selection of specific content (e.g., do not share any synchronization information related to "Moby Dick"). Although interface 1150 is illustrated with regard to a display screen of a wireless device 112, the interface 1150 may be generated by any type of computing device 122 and modified in accordance with resources associated with such alternative computing devices.

Figure 12A:
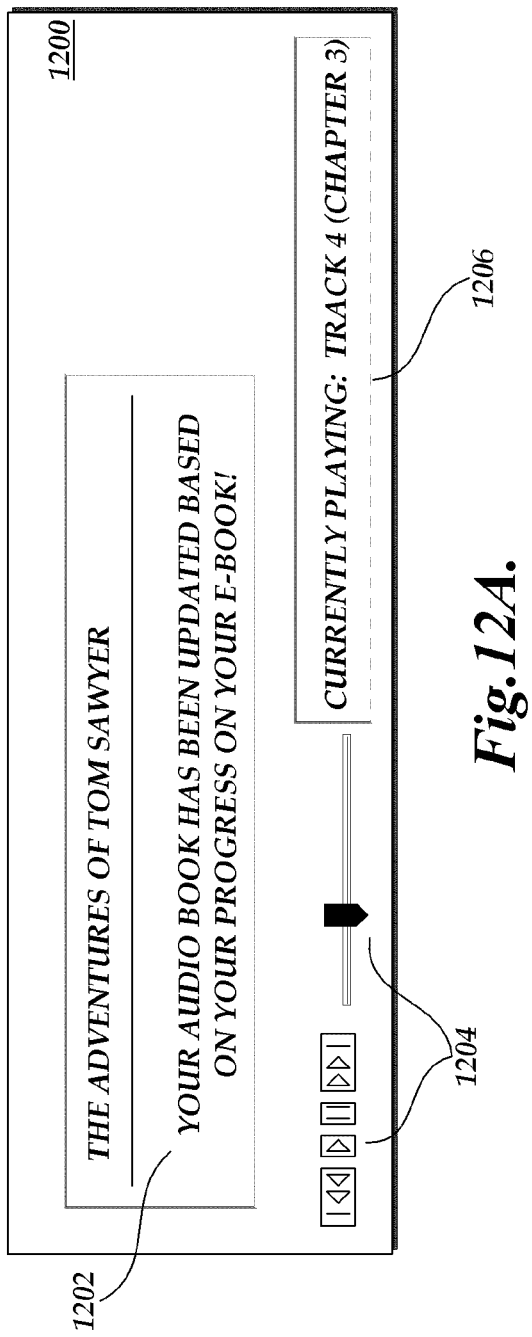
FIG. 12A is an illustrative display associated with a consumer device for configuring the incorporation of synchronization information associated with content accessible by the consumer device.
Figure 12B:
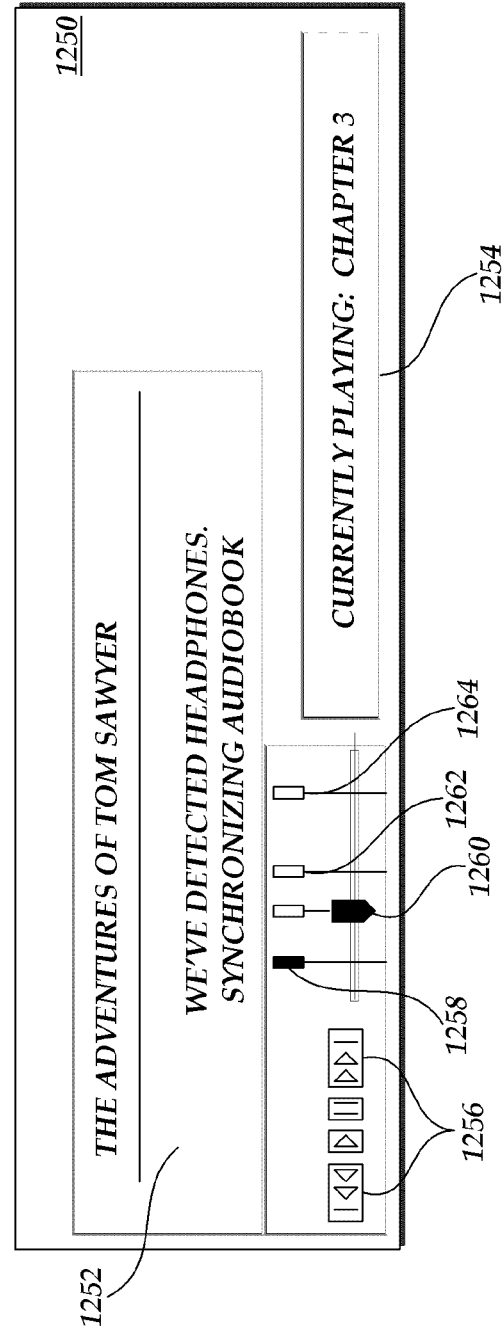
FIG. 12B is an illustrative display associated with a consumer device for configuring the transmittal of synchronization information based on a determination of a synchronization event.

With reference to FIGS. 12A and 12B, illustrative displays 1200 and 1250 corresponding to a receiving computing device, such as a consumer electronics based computing device, will be described. With reference to FIG. 12A, an illustrative display 1200 corresponding to a consumer device for configuring the incorporation of synchronization information based on receipt of synchronization information will be described. In this illustrative embodiment, it is assumed that the synchronization information transmitted by the originating device corresponding to the presentation of a digital publication while the presentation on the receiving device corresponds to audible content, such as an audio book, which has been loaded in a device for use while driving. Accordingly, the synchronization information has been processed, filtered, translated, or otherwise manipulated in accordance with the characteristics of the device or the audio content.

The display 1200 includes a first portion 1202 for notifying the user that synchronization information has been received. In the illustrative example, the synchronization information has been received from an e-book reader via a wireless or wired connection to the consumer device. The display 1200 further includes controls 1204 for manipulating the playback of the digital content. Additionally, the display 1200 includes a second portion 1206 for indicating the current measurement of progress of the presentation of the content on the device. Illustratively, the device may not have the necessary functionality or capabilities to display the additional information, such as highlights or bookmarks. Accordingly, only progress information in the synchronization information is utilized by this device.

With reference now to FIG. 12B, an illustrative display 1250 corresponding to a consumer electronics originating computing device for configuring the transmittal of synchronization information based on a determination of synchronization events will now be described. In this illustrative embodiment, it is assumed that the originating computing device presents an audible representation of content, such as an audio book, which has been loaded in a device for use while driving. In this example, the consumer electronics based originating computing device will transmit the collected synchronization information to other device(s) having a representation of the content (such as via a wireless communication channel). The display 1250 includes a first portion 1252 for notifying the user of the sharing of synchronization information based on the detection of an output device 214 (e.g., the connection of headphones to a device has been configured to correspond to a synchronization event). The display 1250 further includes controls 1256 for manipulating the playback of the content.

In this illustrative example, progress regarding the presentation of content on the device is measured in discrete, predefined units. Accordingly, the display 1250 includes a first indicator 1258 corresponding to a previous reference point from which progress has been previously measured and an indicator 1260 regarding the current, closest reference point. For purposes of the illustrative example, the display 1250 also includes two additional indicators 1262 and 1264 identifying potential future reference points. In this example, a user can utilize the controls 1256 to adjust the reference points (either forward or backward) that will be used to indicate the progress. In one aspect, the user can return to a previous reference point in an effort to repeat the presentation of the content on another device. For example, the user can utilize controls 1256 to cue the presentation of content to such previous reference points. In another aspect, the user can forward to a future reference point to skip portions of the presentation of the content on the other device. Similarly, the user can utilize controls 1256 to cue the presentation of content to such future reference points. One skilled in the relevant art will appreciate that the presentation of audible content can include any number of reference points.

Figure 13A:
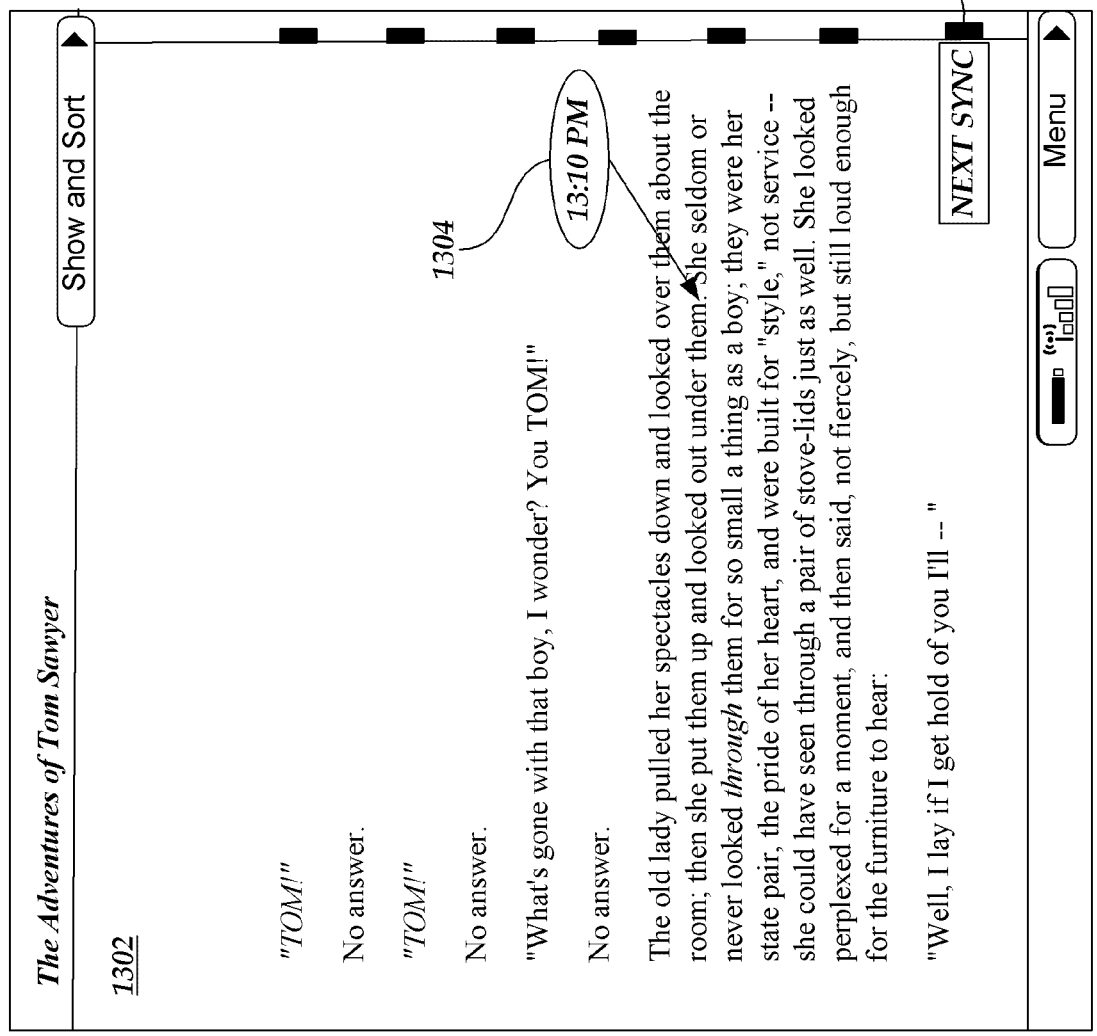

FIGS. 13A and 13B are illustrative screen renderings 1300, 1350 generated on a wireless device 112 based on the incorporation of annotations with the synchronization information associated with content accessible by the wireless device. With reference to FIG. 13A, the screen rendering 1300 corresponding to the presentation of content 1302 at a reference point specified in synchronization information received by the wireless computing device 112. As illustrated in FIG. 13A, the screen rendering 1300 includes a specific identifier 1304 indicative of the last progress during the last presentation of the content. The identifier 1304 includes additional information, such as a time when the synchronization information was obtained from the originating computing device. In an illustrative embodiment in which multiple progress points are received, the screen rendering 1300 includes a control 1306 for instructing the wireless device 112 to proceed to the next annotation, highlight or bookmark.

With reference to FIG. 13B, the screen rendering 1350 corresponds to the incorporation of synchronization information from multiple devices, such as in a collaborative effort. The screen rendering 1350 relates to the presentation of content, such as via a display. In this illustrative example, the content displayed in the screen rendering 1350 is presented at a reference point corresponding to the current user of the device and does not reflect the progress information related to other users. The screen rendering 1350 includes a first identifier 1352 corresponding to additional information, such as an annotation or highlight, provided by one of the multiple devices. The screen rendering 1350 includes a second identifier 1354 corresponding to additional information, such as an annotation or highlight, provided by one of the multiple devices. As illustrated in FIG. 13B, the additional information may be fully displayed on the screen rendering 1350 at 1356 by activating a control, such as hovering a pointing device over identifier 1354. The screen rendering 1350 includes a control 1358 for instructing the wireless device 112 to proceed to the next received annotation or highlight, etc. Providing additional information received from multiple different devices provides the ability for groups of users (e.g., a book club or classroom) to collaborate on the content that is being presented to them.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   at least one processor configured to execute computer-executable instructions stored in memory, the computer-executable instructions that when implemented are operative to:
   cause presentation of content on a first device;
   receive, at the first device, input from a user while a portion of the content is being presented;
   receive, from the first device, synchronization information via a communication network, wherein the synchronization information includes at least time data corresponding to the portion of the content;
   store the synchronization information;
   receive a request from the user to play the content on a second device;
   send the synchronization information to the second device; and
   cause the second device to present the content beginning with the portion of the content based at least in part on the synchronization information.

2. The system as recited in claim 1, wherein the second device is associated with an identifiable account.

3. The system as recited in claim 1, wherein the second device is grouped according to configuration information associated with user profile information.

4. The system as recited in claim 1, wherein sending the synchronization information associated with the portion of the content to the second device includes sending the synchronization information in response to receiving the request from the user to play the content on a second device.

5. The system as recited in claim 4, wherein receiving the request from the user to play the content on a second device includes detecting at least one of a detection of an output device, an initiation of a software application on the second device, or a detection of a user input indicative of a request for presentation of the content on the second device.

6. The system as recited in claim 1, wherein the computer-executable instructions are further operative to cause a generation of a user interface configured to obtain the input.

7. The system as recited in claim 1, wherein causing the second device to present the content beginning with the portion of the content based at least in part on the synchronization information includes an adjustment of the synchronization information.

8. The system as recited in claim 7, wherein the adjustment of the synchronization information is based, in part, on configuration information associated with user profile information.

9. The system as recited in claim 7, wherein the adjustment of the synchronization information includes adjustment of a starting location of the presentation of the portion of the content based on a reduction of the time data.

10. The system as recited in claim 7, wherein the adjustment of the synchronization information includes adjustment of a starting location of the presentation of the portion of the content based on an addition of the time data.

11. The system as recited in claim 1, wherein the input corresponds to a command to stop presentation of the content on the first device.

12. A method comprising:
    causing presentation of content;
    receiving, at a first device, input from a user while a portion of the content is being presented;
    defining synchronization information associated with a current presentation of the portion of the content based on the input, wherein the synchronization information includes at least time data corresponding to the received input from the user;
    storing the defined synchronization information;
    upon receiving a request from the user to present the content at a second device, sending the synchronization information to the second device; and
    causing the second device to present the content beginning with the portion of the content based at least in part on the synchronization information.

13. The method as recited in claim 12, wherein the second device is associated with an identifiable account.

14. The method as recited in claim 12, wherein the second device is grouped according to configuration information associated with user profile information.

15. The method as recited in claim 12, wherein sending the synchronization information associated with the portion of the content to the second device includes sending the synchronization information in response to detecting at least one of a detection of an output device, an initiation of a software application on the second device, or a detection of user input indicative of a request for presentation of the content on the second device.

16. The method as recited in claim 12 further comprising causing generation of a user interface configured to obtain the input.

17. The method as recited in claim 12, wherein the input corresponds to a command to stop presentation of the content on the first device.

18. The method as recited in claim 12, wherein causing the second device to present the content beginning with the portion of the content based at least in part on the synchronization information includes causing the second device to present the content incorporating an adjustment of the synchronization information.

19. The method as recited in claim 18, wherein the adjustment of the synchronization information is based, in part, on configuration information associated with user profile information.

20. The method as recited in claim 18, wherein the adjustment of the synchronization information includes adjustment of a starting location of the presentation of the portion of the content based on a reduction of time.

21. The method as recited in claim 18, wherein the adjustment of the synchronization information includes adjustment of a starting location of the presentation of the portion of the content based on an addition of the time data.

* * * * *

UNITED STATES PATENT AND TRADEMARK OFFICE
CERTIFICATE OF CORRECTION

Page 1 of 1

PATENT NO. : 11,966,879 B2
APPLICATION NO. : 17/656626
DATED : April 23, 2024
INVENTOR(S) : Steven Kessel et al.

It is certified that error appears in the above-identified patent and that said Letters Patent is hereby corrected as shown below:

In the Specification

At Column 1, Line 8, delete "15/640,252," and insert -- 16/690,939, --.

At Column 1, Line 9, after "CONTENT," insert -- and filed November 21, 2019, which is a continuation of U.S. Patent Application No. 15/640,252, entitled SYNCHRONIZATION OF DIGITAL CONTENT, --.

Signed and Sealed this
Seventeenth Day of September, 2024

Katherine Kelly Vidal
*Director of the United States Patent and Trademark Office*